(12) United States Patent
Ståhl et al.

(10) Patent No.: US 11,396,031 B2
(45) Date of Patent: *Jul. 26, 2022

(54) DRIVER CIRCUITRY

(71) Applicant: Cirrus Logic International Semiconductor Ltd., Edinburgh (GB)

(72) Inventors: Carl Lennart Ståhl, Malmö (SE); Emmanuel Marchais, Dripping Springs, TX (US); Anthony Stephen Doy, Los Gatos, CA (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/928,106

(22) Filed: Jul. 14, 2020

(65) Prior Publication Data

US 2020/0406296 A1    Dec. 31, 2020

Related U.S. Application Data

(63) Continuation of application No. 16/369,556, filed on Mar. 29, 2019, now Pat. No. 10,828,672.

(51) Int. Cl.
*B06B 1/02*    (2006.01)
*G06F 3/01*    (2006.01)

(52) U.S. Cl.
CPC ............ *B06B 1/0207* (2013.01); *G06F 3/016* (2013.01)

(58) Field of Classification Search
CPC ............................. B06B 1/0207; G06F 3/016
See application file for complete search history.

(56) References Cited

U.S. PATENT DOCUMENTS 3,686,927 A    8/1972 Scharton
4,902,136 A    2/1990 Mueller et al.
(Continued)

FOREIGN PATENT DOCUMENTS

AU    2002347829    4/2003
CN    103165328 A    6/2013
(Continued)

OTHER PUBLICATIONS

International Search Report and Written Opinion of the International Searching Authority, International Application No. PCT/GB2019/050964, dated Sep. 3, 2019.
(Continued)

*Primary Examiner* — Nader Bolourchi
(74) *Attorney, Agent, or Firm* — Jackson Walker L.L.P.

(57) ABSTRACT

Driver circuitry for driving an electromechanical load with a drive output signal based on a digital reference signal at a first sample rate, the drive output signal inducing a first electrical quantity at the electromechanical load, the driver circuitry comprising: a function block configured, based on said first electrical quantity, to digitally determine at a second sample rate higher than the first sample rate an adjustment signal indicative of a second electrical quantity which would be induced at a target output impedance of the driver circuitry due to said first electrical quantity; and a driver configured to generate the drive output signal based on the reference signal and the adjustment signal to cause the drive output signal to behave as if an output impedance of the driver circuitry has been adjusted to comprise the target output impedance, wherein the first electrical quantity is a current and the second electrical quantity is a voltage, or vice versa.

19 Claims, 12 Drawing Sheets

(56) References Cited

U.S. PATENT DOCUMENTS

| | | |
|---|---|---|
| 5,374,896 A | 12/1994 | Sato et al. |
| 5,684,722 A | 11/1997 | Thorner et al. |
| 5,748,578 A | 5/1998 | Schell |
| 5,857,986 A | 1/1999 | Moriyasu |
| 6,050,393 A | 4/2000 | Murai et al. |
| 6,278,790 B1 | 8/2001 | Davis et al. |
| 6,294,891 B1 | 9/2001 | McConnell et al. |
| 6,332,029 B1 | 12/2001 | Azima et al. |
| 6,388,520 B2 | 5/2002 | Wada et al. |
| 6,567,478 B2 | 5/2003 | Oishi et al. |
| 6,580,796 B1 | 6/2003 | Kuroki |
| 6,683,437 B2 | 1/2004 | Tierling |
| 6,703,550 B2 | 3/2004 | Chu |
| 6,762,745 B1 | 7/2004 | Braun et al. |
| 6,768,779 B1 | 7/2004 | Nielsen |
| 6,784,740 B1 | 8/2004 | Tabatabaei |
| 6,906,697 B2 | 6/2005 | Rosenberg |
| 6,995,747 B2 | 2/2006 | Casebolt et al. |
| 7,042,286 B2 | 5/2006 | Meade et al. |
| 7,154,470 B2 | 12/2006 | Tierling |
| 7,277,678 B2 | 10/2007 | Rozenblit et al. |
| 7,333,604 B2 | 2/2008 | Zernovizky et al. |
| 7,392,066 B2 | 6/2008 | Haparnas |
| 7,456,688 B2 | 11/2008 | Okazaki et al. |
| 7,623,114 B2 | 11/2009 | Rank |
| 7,639,232 B2 | 12/2009 | Grant et al. |
| 7,777,566 B1 | 8/2010 | Drogi et al. |
| 7,791,588 B2 | 9/2010 | Tierling et al. |
| 7,979,146 B2 | 7/2011 | Ullrich et al. |
| 8,068,025 B2 | 11/2011 | Devenyi et al. |
| 8,098,234 B2 | 1/2012 | Lacroix et al. |
| 8,102,364 B2 | 1/2012 | Tierling |
| 8,325,144 B1 | 12/2012 | Tierling et al. |
| 8,427,286 B2 | 4/2013 | Grant et al. |
| 8,441,444 B2 | 5/2013 | Moore et al. |
| 8,466,778 B2 | 6/2013 | Hwang et al. |
| 8,480,240 B2 | 7/2013 | Kashiyama |
| 8,572,293 B2 | 10/2013 | Cruz-Hernandez et al. |
| 8,572,296 B2 | 10/2013 | Shasha et al. |
| 8,593,269 B2 | 11/2013 | Grant et al. |
| 8,648,659 B2 | 2/2014 | Oh et al. |
| 8,648,829 B2 | 2/2014 | Shahoian et al. |
| 8,659,208 B1 | 2/2014 | Rose et al. |
| 8,754,757 B1 | 6/2014 | Ullrich et al. |
| 8,947,216 B2 | 2/2015 | Da Costa et al. |
| 8,981,915 B2 | 3/2015 | Birnbaum et al. |
| 8,994,518 B2 | 3/2015 | Gregorio et al. |
| 9,030,428 B2 | 5/2015 | Fleming |
| 9,063,570 B2 | 6/2015 | Weddle et al. |
| 9,083,821 B2 | 7/2015 | Hughes |
| 9,092,059 B2 | 7/2015 | Bhatia |
| 9,117,347 B2 | 8/2015 | Matthews |
| 9,128,523 B2 | 9/2015 | Buuck et al. |
| 9,164,587 B2 | 10/2015 | Da Costa et al. |
| 9,196,135 B2 | 11/2015 | Shah et al. |
| 9,248,840 B2 | 2/2016 | Truong |
| 9,326,066 B2 | 4/2016 | Klippel |
| 9,329,721 B1 | 5/2016 | Buuck et al. |
| 9,354,704 B2 | 5/2016 | Lacroix et al. |
| 9,368,005 B2 | 6/2016 | Cruz-Hernandez et al. |
| 9,489,047 B2 | 11/2016 | Jiang et al. |
| 9,495,013 B2 | 11/2016 | Underkoffler et al. |
| 9,507,423 B2 | 11/2016 | Gandhi et al. |
| 9,513,709 B2 | 12/2016 | Gregorio et al. |
| 9,520,036 B1 | 12/2016 | Buuck |
| 9,588,586 B2 | 3/2017 | Rihn |
| 9,640,047 B2 | 5/2017 | Choi et al. |
| 9,652,041 B2 | 5/2017 | Jiang et al. |
| 9,696,859 B1 | 7/2017 | Heller et al. |
| 9,697,450 B1 | 7/2017 | Lee |
| 9,715,300 B2 | 7/2017 | Sinclair et al. |
| 9,740,381 B1 | 8/2017 | Chaudhri et al. |
| 9,842,476 B2 | 12/2017 | Rihn et al. |
| 9,864,567 B2 | 1/2018 | Seo |
| 9,881,467 B2 | 1/2018 | Levesque |
| 9,886,829 B2 | 2/2018 | Levesque |
| 9,946,348 B2 | 4/2018 | Ullrich et al. |
| 9,947,186 B2 | 4/2018 | Macours |
| 9,959,744 B2 | 5/2018 | Koskan et al. |
| 9,965,092 B2 | 5/2018 | Smith |
| 10,032,550 B1 | 7/2018 | Zhang et al. |
| 10,055,950 B2 | 8/2018 | Saboune et al. |
| 10,074,246 B2 | 9/2018 | Da Costa et al. |
| 10,110,152 B1 | 10/2018 | Hajati |
| 10,171,008 B2 | 1/2019 | Nishitani et al. |
| 10,175,763 B2 | 1/2019 | Shah |
| 10,191,579 B2 | 1/2019 | Forlines et al. |
| 10,264,348 B1 | 4/2019 | Harris et al. |
| 10,564,727 B2 | 2/2020 | Billington et al. |
| 10,620,704 B2 | 4/2020 | Rand et al. |
| 10,667,051 B2 | 5/2020 | Stahl |
| 10,726,638 B2 | 7/2020 | Mondello et al. |
| 10,782,785 B2 | 9/2020 | Hu et al. |
| 10,795,443 B2 | 10/2020 | Hu et al. |
| 10,820,100 B2 | 10/2020 | Stahl et al. |
| 10,828,672 B2 | 11/2020 | Stahl et al. |
| 10,832,537 B2 | 11/2020 | Doy et al. |
| 10,848,886 B2 | 11/2020 | Rand |
| 10,860,202 B2 | 12/2020 | Sepehr et al. |
| 10,969,871 B2 | 4/2021 | Rand et al. |
| 11,259,121 B2 | 2/2022 | Lindemann et al. |
| 2001/0043714 A1 | 11/2001 | Asada et al. |
| 2002/0018578 A1 | 2/2002 | Burton |
| 2002/0085647 A1 | 7/2002 | Oishi et al. |
| 2003/0068053 A1 | 4/2003 | Chu |
| 2003/0214485 A1 | 11/2003 | Roberts |
| 2005/0031140 A1 | 2/2005 | Browning |
| 2005/0134562 A1 | 6/2005 | Grant et al. |
| 2006/0028095 A1 | 2/2006 | Maruyama et al. |
| 2006/0197753 A1 | 9/2006 | Hotelling |
| 2007/0024254 A1 | 2/2007 | Radecker et al. |
| 2007/0241816 A1 | 10/2007 | Okazaki et al. |
| 2008/0077367 A1 | 3/2008 | Odajima |
| 2008/0167832 A1 | 7/2008 | Soss |
| 2008/0226109 A1 | 9/2008 | Yamakata et al. |
| 2008/0240458 A1 | 10/2008 | Goldstein et al. |
| 2008/0293453 A1 | 11/2008 | Atlas et al. |
| 2008/0316181 A1 | 12/2008 | Nurmi |
| 2009/0020343 A1 | 1/2009 | Rothkopf et al. |
| 2009/0079690 A1 | 3/2009 | Watson et al. |
| 2009/0088220 A1 | 4/2009 | Persson |
| 2009/0096632 A1 | 4/2009 | Ullrich et al. |
| 2009/0102805 A1 | 4/2009 | Meijer et al. |
| 2009/0128306 A1 | 5/2009 | Luden et al. |
| 2009/0153499 A1 | 6/2009 | Kim et al. |
| 2009/0189867 A1 | 7/2009 | Krah et al. |
| 2009/0278819 A1 | 11/2009 | Goldenberg et al. |
| 2009/0313542 A1 | 12/2009 | Cruz-Hernandez et al. |
| 2010/0013761 A1 | 1/2010 | Birnbaum et al. |
| 2010/0085317 A1 | 4/2010 | Park et al. |
| 2010/0141408 A1 | 6/2010 | Doy et al. |
| 2010/0141606 A1 | 6/2010 | Bae et al. |
| 2010/0260371 A1 | 10/2010 | Afshar |
| 2010/0261526 A1 | 10/2010 | Anderson et al. |
| 2011/0056763 A1 | 3/2011 | Tanase et al. |
| 2011/0075835 A1 | 3/2011 | Hill |
| 2011/0077055 A1 | 3/2011 | Pakula et al. |
| 2011/0141052 A1 | 6/2011 | Bernstein et al. |
| 2011/0161537 A1 | 6/2011 | Chang |
| 2011/0163985 A1 | 7/2011 | Bae et al. |
| 2011/0167391 A1 | 7/2011 | Momeyer et al. |
| 2012/0011436 A1 | 1/2012 | Jinkinson et al. |
| 2012/0112894 A1 | 5/2012 | Yang et al. |
| 2012/0206246 A1 | 8/2012 | Cruz-Hernandez et al. |
| 2012/0206247 A1 | 8/2012 | Bhatia et al. |
| 2012/0229264 A1 | 9/2012 | Company Bosch et al. |
| 2012/0249462 A1 | 10/2012 | Flanagan et al. |
| 2012/0253698 A1 | 10/2012 | Cokonaj |
| 2012/0306631 A1 | 12/2012 | Hughes |
| 2013/0016855 A1 | 1/2013 | Lee et al. |
| 2013/0027359 A1 | 1/2013 | Schevin et al. |
| 2013/0038792 A1 | 2/2013 | Quigley et al. |
| 2013/0096849 A1 | 4/2013 | Campbell et al. |
| 2013/0141382 A1 | 6/2013 | Simmons et al. |

(56) References Cited

U.S. PATENT DOCUMENTS

| | | |
|---|---|---|
| 2013/0275058 A1 | 10/2013 | Awad |
| 2013/0289994 A1 | 10/2013 | Newman et al. |
| 2014/0056461 A1 | 2/2014 | Afshar |
| 2014/0064516 A1 | 3/2014 | Cruz-Hernandez et al. |
| 2014/0079248 A1 | 3/2014 | Short et al. |
| 2014/0085064 A1 | 3/2014 | Crawley et al. |
| 2014/0118125 A1 | 5/2014 | Bhatia |
| 2014/0118126 A1 | 5/2014 | Garg et al. |
| 2014/0119244 A1 | 5/2014 | Steer et al. |
| 2014/0139327 A1 | 5/2014 | Bau et al. |
| 2014/0222377 A1 | 8/2014 | Bitan et al. |
| 2014/0226068 A1 | 8/2014 | Lacroix et al. |
| 2014/0292501 A1 | 10/2014 | Lim et al. |
| 2014/0340209 A1 | 11/2014 | Lacroix et al. |
| 2014/0347176 A1 | 11/2014 | Modarres et al. |
| 2015/0061846 A1 | 3/2015 | Yliaho |
| 2015/0070149 A1 | 3/2015 | Cruz-Hernandez et al. |
| 2015/0070151 A1 | 3/2015 | Cruz-Hernandez et al. |
| 2015/0070154 A1 | 3/2015 | Levesque et al. |
| 2015/0070260 A1 | 3/2015 | Saboune et al. |
| 2015/0084752 A1 | 3/2015 | Heubel et al. |
| 2015/0130767 A1 | 5/2015 | Myers et al. |
| 2015/0208189 A1 | 7/2015 | Tsai |
| 2015/0216762 A1 | 8/2015 | Oohashi et al. |
| 2015/0234464 A1 | 8/2015 | Yliaho |
| 2015/0324116 A1 | 11/2015 | Marsden et al. |
| 2015/0325116 A1 | 11/2015 | Umminger, III |
| 2015/0341714 A1 | 11/2015 | Ahn et al. |
| 2016/0004311 A1 | 1/2016 | Yliaho |
| 2016/0007095 A1 | 1/2016 | Lacroix |
| 2016/0063826 A1 | 3/2016 | Morrell et al. |
| 2016/0070392 A1 | 3/2016 | Wang et al. |
| 2016/0074278 A1 | 3/2016 | Muench et al. |
| 2016/0132118 A1 | 5/2016 | Park et al. |
| 2016/0162031 A1 | 6/2016 | Westerman et al. |
| 2016/0179203 A1 | 6/2016 | Modarres et al. |
| 2016/0239089 A1 | 8/2016 | Taninaka et al. |
| 2016/0246378 A1 | 8/2016 | Sampanes et al. |
| 2016/0291731 A1 | 10/2016 | Liu et al. |
| 2016/0358605 A1 | 12/2016 | Ganong, III et al. |
| 2017/0052593 A1 | 2/2017 | Jiang et al. |
| 2017/0078804 A1 | 3/2017 | Guo et al. |
| 2017/0083096 A1 | 3/2017 | Rihn et al. |
| 2017/0090572 A1 | 3/2017 | Holenarsipur et al. |
| 2017/0090573 A1 | 3/2017 | Hajati et al. |
| 2017/0153760 A1 | 6/2017 | Chawda et al. |
| 2017/0168574 A1 | 6/2017 | Zhang |
| 2017/0169674 A1 | 6/2017 | Macours |
| 2017/0220197 A1 | 8/2017 | Matsumoto et al. |
| 2017/0256145 A1 | 9/2017 | Macours et al. |
| 2017/0357440 A1 | 12/2017 | Tse |
| 2018/0021811 A1 | 1/2018 | Kutej et al. |
| 2018/0059733 A1 | 3/2018 | Gault et al. |
| 2018/0059793 A1 | 3/2018 | Hajati |
| 2018/0067557 A1 | 3/2018 | Robert et al. |
| 2018/0074637 A1 | 3/2018 | Rosenberg et al. |
| 2018/0082673 A1 | 3/2018 | Tzanetos |
| 2018/0084362 A1 | 3/2018 | Zhang et al. |
| 2018/0095596 A1 | 4/2018 | Turgeman |
| 2018/0151036 A1 | 5/2018 | Cha et al. |
| 2018/0158289 A1* | 6/2018 | Vasilev .............. G08B 6/00 |
| 2018/0159452 A1* | 6/2018 | Eke .................... G05F 1/00 |
| 2018/0159457 A1* | 6/2018 | Eke .................... H03L 7/099 |
| 2018/0159545 A1* | 6/2018 | Eke .................... H03L 7/099 |
| 2018/0160227 A1 | 6/2018 | Lawrence et al. |
| 2018/0165925 A1 | 6/2018 | Israr et al. |
| 2018/0178114 A1 | 6/2018 | Mizuta et al. |
| 2018/0182212 A1 | 6/2018 | Li et al. |
| 2018/0183372 A1 | 6/2018 | Li et al. |
| 2018/0196567 A1 | 7/2018 | Klein et al. |
| 2018/0224963 A1 | 8/2018 | Lee et al. |
| 2018/0237033 A1 | 8/2018 | Hakeem et al. |
| 2018/0253123 A1 | 9/2018 | Levesque et al. |
| 2018/0255411 A1 | 9/2018 | Lin et al. |
| 2018/0267897 A1 | 9/2018 | Jeong |
| 2018/0294757 A1 | 10/2018 | Feng et al. |
| 2018/0301060 A1 | 10/2018 | Israr et al. |
| 2018/0321748 A1 | 11/2018 | Rao et al. |
| 2018/0323725 A1 | 11/2018 | Cox et al. |
| 2018/0329172 A1 | 11/2018 | Tabuchi |
| 2018/0335848 A1 | 11/2018 | Moussette et al. |
| 2018/0367897 A1 | 12/2018 | Bjork et al. |
| 2019/0020760 A1 | 1/2019 | Debates et al. |
| 2019/0227628 A1 | 1/2019 | Rand et al. |
| 2019/0064925 A1 | 2/2019 | Kim et al. |
| 2019/0069088 A1 | 2/2019 | Seiler |
| 2019/0073078 A1 | 3/2019 | Sheng et al. |
| 2019/0103829 A1 | 4/2019 | Vasudevan et al. |
| 2019/0138098 A1 | 5/2019 | Shah |
| 2019/0163234 A1 | 5/2019 | Kim et al. |
| 2019/0196596 A1 | 6/2019 | Yokoyama et al. |
| 2019/0206396 A1 | 7/2019 | Chen |
| 2019/0215349 A1 | 7/2019 | Adams et al. |
| 2019/0220095 A1 | 7/2019 | Ogita et al. |
| 2019/0228619 A1 | 7/2019 | Yokoyama et al. |
| 2019/0114496 A1 | 8/2019 | Lesso |
| 2019/0235629 A1 | 8/2019 | Hu et al. |
| 2019/0294247 A1 | 9/2019 | Hu et al. |
| 2019/0296674 A1 | 9/2019 | Janko et al. |
| 2019/0297418 A1 | 9/2019 | Stahl |
| 2019/0311590 A1 | 10/2019 | Doy et al. |
| 2019/0341903 A1 | 11/2019 | Kim |
| 2020/0117506 A1 | 4/2020 | Chan |
| 2020/0139403 A1 | 5/2020 | Palit |
| 2020/0218352 A1 | 7/2020 | Macours et al. |
| 2020/0313654 A1 | 10/2020 | Marchais et al. |
| 2021/0108975 A1 | 4/2021 | Peso Parada et al. |
| 2021/0157436 A1 | 5/2021 | Peso Parada et al. |
| 2021/0174777 A1 | 6/2021 | Marchais et al. |
| 2021/0175869 A1 | 6/2021 | Taipale |
| 2021/0200316 A1 | 7/2021 | Das et al. |
| 2021/0365118 A1 | 11/2021 | Rajapurkar et al. |
| 2022/0026989 A1 | 1/2022 | Rao et al. |

FOREIGN PATENT DOCUMENTS

| | | |
|---|---|---|
| CN | 103403796 A | 11/2013 |
| CN | 204903757 U | 12/2015 |
| CN | 105264551 A | 1/2016 |
| CN | 106438890 A | 2/2017 |
| CN | 106950832 A | 7/2017 |
| CN | 107665051 A | 2/2018 |
| EP | 0784844 B1 | 6/2005 |
| EP | 2363785 A1 | 9/2011 |
| EP | 2487780 A1 | 8/2012 |
| EP | 2600225 A1 | 6/2013 |
| EP | 2846218 A1 | 3/2015 |
| EP | 2846229 A2 | 3/2015 |
| EP | 2846329 A1 | 3/2015 |
| EP | 2988528 A1 | 2/2016 |
| EP | 3125508 A1 | 2/2017 |
| EP | 3379382 A1 | 9/2018 |
| GB | 201620746 A | 1/2017 |
| IN | 201747044027 | 8/2018 |
| JP | H02130433 B2 | 5/1990 |
| JP | 08149006 A | 6/1996 |
| JP | 6026751 B2 | 11/2016 |
| JP | 6250985 | 12/2017 |
| JP | 6321351 | 5/2018 |
| KR | 20120126446 A | 11/2012 |
| WO | 2013104919 A1 | 7/2013 |
| WO | 2013186845 A1 | 12/2013 |
| WO | 2014018086 A1 | 1/2014 |
| WO | 2014094283 A1 | 6/2014 |
| WO | 2016105496 A1 | 6/2016 |
| WO | 2016164193 A1 | 10/2016 |
| WO | 2017113651 A1 | 7/2017 |
| WO | 2018053159 A1 | 3/2018 |
| WO | 2018067613 A1 | 4/2018 |
| WO | 2018125347 A1 | 7/2018 |

(56) References Cited

FOREIGN PATENT DOCUMENTS

| WO | 2020004840 A1 | 1/2020 |
|---|---|---|
| WO | 2020055405 A1 | 3/2020 |

OTHER PUBLICATIONS

International Search Report and Written Opinion of the International Searching Authority, International Application No. PCT/GB2019/050770, dated Jul. 5, 2019.
Communication Relating to the Results of the Partial International Search, and Provisional Opinion Accompanying the Partial Search Result, of the International Searching Authority, International Application No. PCT/US2018/031329, dated Jul. 20, 2018.
Combined Search and Examination Report, UKIPO, Application No. GB1720424.9, dated Jun. 5, 2018.
International Search Report and Written Opinion of the International Searching Authority, International Application No. PCT/GB2019/052991, dated Mar. 17, 2020, received by Applicant Mar. 19, 2020.
Communication Relating to the Results of the Partial International Search, and Provisional Opinion Accompanying the Partial Search Result, of the International Searching Authority, International Application No. PCT/GB2020/050822, dated Jul. 9, 2020.
International Search Report and Written Opinion of the International Searching Authority, International Application No. PCT/GB2020/051035, dated Jul. 10, 2020.
International Search Report and Written Opinion of the International Searching Authority, International Application No. PCT/GB2020/050823, dated Jun. 30, 2020.
International Search Report and Written Opinion of the International Searching Authority, International Application No. PCT/US2020/024864, dated Jul. 6, 2020.
International Search Report and Written Opinion of the International Searching Authority, International Application No. PCT/GB2020/051037, dated Jul. 9, 2020.
International Search Report and Written Opinion of the International Searching Authority, International Application No. PCT/GB2019/023342, dated Jun. 9, 2020.
International Search Report and Written Opinion of the International Searching Authority, International Application No. PCT/GB2020/050822, dated Aug. 31, 2020.
International Search Report and Written Opinion of the International Searching Authority, International Application No. PCT/GB2020/051438, dated Sep. 28, 2020.
First Examination Opinion Notice, State Intellectual Property Office of the People's Republic of China, Application No. 201880037435.X, dated Dec. 31, 2020.
Invitation to Pay Additional Fees, Partial International Search Report and Provisional Opinion of the International Searching Authority, International Application No. PCT/GB2020/052537, dated Jan. 14, 2021.
International Search Report and Written Opinion of the International Searching Authority, International Application No. PCT/US2020/056610, dated Jan. 21, 2021.
International Search Report and Written Opinion of the International Searching Authority, International Application No. PCT/GB2020/052537, dated Mar. 9, 2021.
Office Action of the Intellectual Property Office, ROC (Taiwan) Patent Application No. 107115475, dated Apr. 30, 2021.
First Office Action, China National Intellectual Property Administration, Patent Application No. 2019800208570, dated Jun. 3, 2021.
International Search Report and Written Opinion of the International Searching Authority, International Application No. PCT/US2021/021908, dated Jun. 9, 2021.
Notice of Preliminary Rejection, Korean Intellectual Property Office, Application No. 10-2019-7036236, dated Jun. 29, 2021.
Combined Search and Examination Report, United Kingdom Intellectual Property Office, Application No. GB2018051.9, dated Jun. 30, 2021.
Communication pursuant to Rule 164(2)(b) and Article 94(3) EPC, European Patent Office, Application No. 18727512.8, dated Jul. 8, 2021.
Gottfried Behler: "Measuring the Loudspeaker's Impedance during Operation for the Derivation of the Voice Coil Temperature", AES Convention Preprint, Feb. 25, 1995 (Feb. 25, 1995), Paris.
First Office Action, China National Intellectual Property Administration, Patent Application No. 2019800211287, dated Jul. 5, 2021.
Steinbach et al., Haptic Data Compression and Communication, IFFF Signal Processing Magazine, Jan. 2011.
Pezent et al., Syntacts Open-Source Software and Hardware for Audio-Controlled Haptics, IEEE Transactions on Haptics, vol. 14, No. 1, Jan.-Mar. 2021.
Examination Report under Section 18(3), United Kingdom Intellectual Property Office, Application No. GB2106247.6, dated Mar. 31, 2022.
Final Notice of Preliminary Rejection, Korean Patent Office, Application No. 10-2019-7036236, dated Nov. 29, 2021.
Examination Report under Section 18(3), United Kingdom Intellectual Property Office, Application No. GB2018050.1, dated Dec. 22, 2021.
Second Office Action. National Intellectual Property Administration, PRC, Application No. 201900208570, dated Jan. 19, 2022.

* cited by examiner

Fig. 1
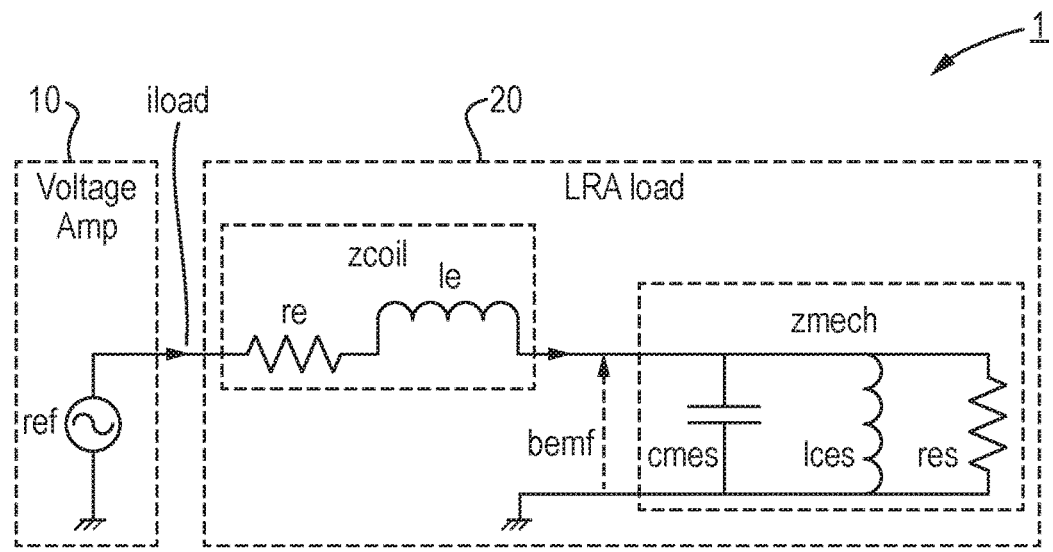
$$\text{bemfTF} \rightarrow \frac{\text{zBemf}}{\text{zBemf} + \text{zCoil}},$$
$$\text{iloadTF} \rightarrow \frac{1}{\text{zBemf} + \text{zCoil}}$$
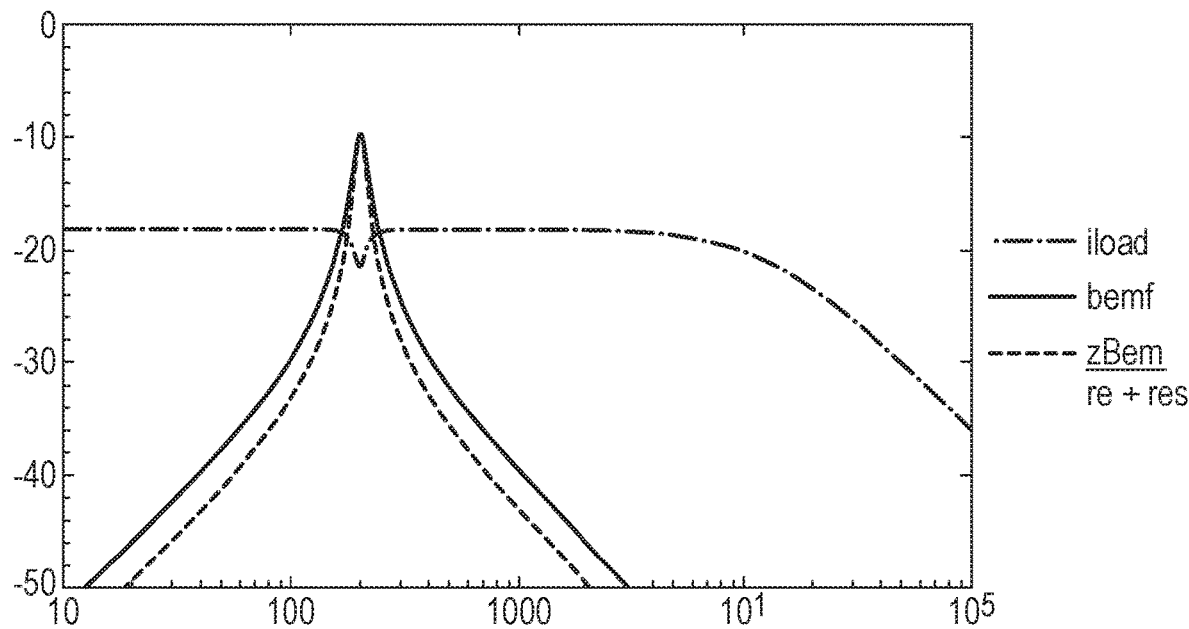

ser_r = -re (approx.)

ser_r = -re (approx.)
ser_l = -le ser_r = -re (approx.)
ser_l = -le ser_r = -re (approx.)

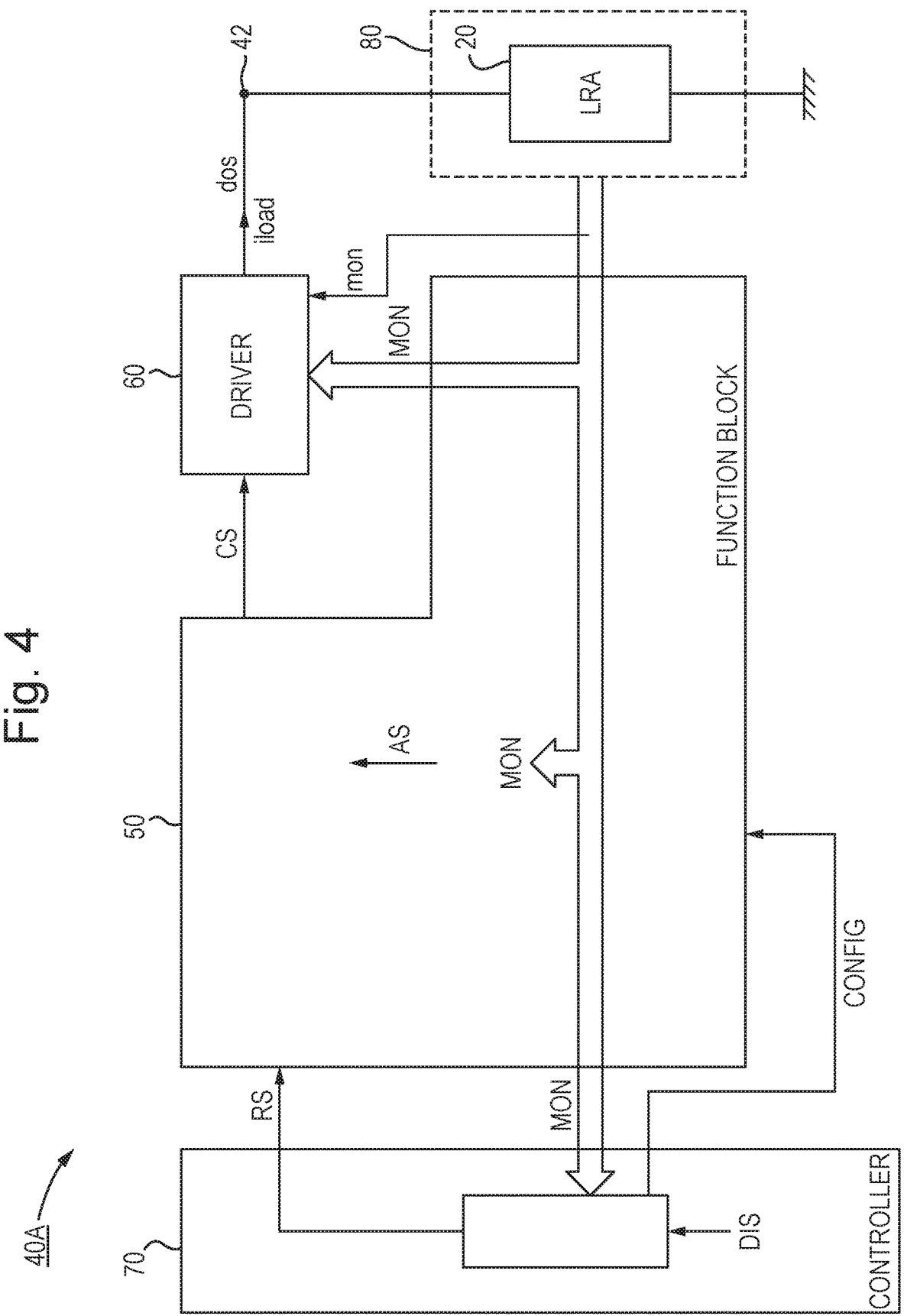

DRIVER CIRCUITRY

The present disclosure is a continuation of U.S. patent application Ser. No. 16/369,556, filed Mar. 29, 2019, which is incorporated by reference herein in its entirety.

FIELD OF DISCLOSURE

The present disclosure relates in general to driver circuitry, in particular for use in driving an electromechanical load or device. One example of an electromechanical load (electromechanical device) is an actuator such as a linear resonant actuator (LRA).

The present disclosure extends to methods carried out by such driver circuitry and to systems, such as haptic systems, comprising such driver circuitry.

BACKGROUND

Driver circuitry may be implemented (at least partly on ICs) within a host device (host apparatus), which may be considered an electrical or electronic device and may be a mobile device. Example host devices include a portable and/or battery powered host device such as a mobile telephone, a smartphone, an audio player, a video player, a PDA, a mobile computing platform such as a laptop computer or tablet and/or a games device.

As is well known, haptic technology recreates the sense of touch by applying forces, vibrations, or motions to a user. Haptic devices (devices enabled with haptic technology) may incorporate tactile sensors (input transducers) that measure forces exerted by the user on a user interface (such as a button or touchscreen on a mobile telephone or tablet computer) as well as output transducers (electromechanical loads) which apply forces directly or indirectly (e.g. via a touchscreen) to a user. Taking a haptic system as an example, with an LRA serving as the electromechanical load, driver circuitry may be employed to drive the LRA to produce a haptic effect (such as a vibration or other tactile sensation) for a user. Audio-to-haptic conversion may also be employed for example in connection with a user playing a video game, to convert an audio signal into a corresponding haptic signal to provide a tactile sensation (output via an electromechanical load such as an LRA) alongside an audio signal (output via a speaker).

The main components of an LRA are a voice coil, a moveable magnetic mass, a spring and a casing or chassis. The magnetic mass is connected to the spring which in turn is mounted to the casing or chassis of the LRA. An AC voltage signal (a drive signal) is used to drive the voice coil, which is arranged to magnetically couple with the moveable magnetic mass.

An LRA typically produces an oscillating force or vibration along an axis. When the voice coil is driven with the AC voltage signal (particularly at the resonant frequency of spring-mass arrangement), the resultant magnetic field induces movement in the magnetic mass and causes it to vibrate with a human-perceptible force. It is the vibration of the mass with a perceptible force which provides the haptic effect. Essentially, the frequency and amplitude of the AC voltage signal is converted into a vibrational frequency and amplitude of the magnetic mass connected to the spring. The LRA is thus a form of transducer. LRAs are typically highly resonant, and as such are generally driven at their resonant frequency for efficiency, i.e. to optimise the relationship between the haptic effect and power consumption.

Of course, an LRA is one example type of electromechanical load (being an actuator or transducer), which is particularly suitable for producing a haptic effect for a user in the context of host devices as mentioned above. Driver circuitry may be used to drive other types of electromechanical load (electromechanical device), e.g. which can be modelled as a resonant actuator such as a speaker or microspeaker or which have non-resonant mechanical loads such as a solenoid or voice coil motor that is non-resonant.

The example of driving an LRA will be carried forward herein in the context of haptic systems as a convenient running example.

Accuracy of control of actuators and transducers is important, for example in the field of haptic technology (e.g. haptic feedback). The quality of the user haptic experience where an LRA is used is defined by the accuracy of control of the LRA, for example.

It is desirable to provide improved driver circuitry with this in mind, to improve control (e.g. mechanical control) of an electromechanical load driven by that circuitry.

SUMMARY

According to a first aspect of the present disclosure, there is provided driver circuitry for driving an electromechanical load with a drive output signal based on a digital reference signal at a first sample rate, the drive output signal inducing a first electrical quantity at the electromechanical load. The driver circuitry may comprise: a function block configured, based on said first electrical quantity, to digitally determine at a second sample rate higher than the first sample rate an adjustment signal indicative of a second electrical quantity which would be induced at a target output impedance of the driver circuitry due to said first electrical quantity; and a driver configured to generate the drive output signal based on the reference signal and the adjustment signal to cause the drive output signal to behave as if an output impedance of the driver circuitry has been adjusted to comprise the target output impedance. The first electrical quantity may be a current and the second electrical quantity may be a voltage, or vice versa.

By digitally determining the adjustment signal, it is possible to cause the drive output signal to behave as if the output impedance of the driver circuitry has been adjusted to comprise the target output impedance in a highly adaptable and controllable manner. Further, by digitally determining the adjustment signal at the second sample rate higher than the first sample rate, the target output impedance is implemented over a relatively wide bandwidth.

The drive output signal may be a voltage signal (voltage mode control). In that case, the first electrical quantity may be a current drawn by the electromechanical load and the second electrical quantity may be a voltage across the target output impedance.

The drive output signal may be a current signal (current mode control). In that case, the first electrical quantity may be a voltage across the electromechanical load and the second electrical quantity may be a current drawn by the target output impedance.

The function block may be configured to digitally determine the adjustment signal based on the first electrical quantity and a definition of the target output impedance. For example, the definition may comprise one or more configuration values. The driver circuitry may comprise (or have access to) storage for storing the one or more configuration values, wherein an impedance value of the target output impedance is maintained when the one or more configuration values stored in the storage are maintained. That is, the impedance value of the target output impedance may be dependent on the configuration values.

A (hypothetical) target equivalent circuit representative of the target output impedance may comprise one or more impedance components and a circuit structure for connecting the one or more impedance components together. The one or more configuration values may define at least one said impedance component and/or said circuit structure.

The target equivalent circuit may comprise a plurality of impedance components connected together. The function block may be configured, based on said first electrical quantity and the one or more configuration values, to: determine a plurality of adjustment sub-signals each representative of a corresponding part of the target equivalent circuit and indicative of a portion of the second electrical quantity which would be induced at the corresponding part of the target equivalent circuit if said second electrical quantity were induced at the target equivalent circuit; and determine the adjustment signal by combining the plurality of adjustment sub-signals.

The portion of the second electrical quantity may be a voltage across the corresponding part of the target equivalent circuit if the second electrical quantity is the voltage across the target output impedance. The portion of the second electrical quantity may be a current drawn by the corresponding part of the target equivalent circuit if the second electrical quantity is the current drawn by the target output impedance.

The one or more configuration values may define the target equivalent circuit to comprise at least one of a series resistor, a series capacitor, a series inductor and a parallel network of impedances. The parallel network of impedances may comprise at least two of a parallel resistor, a parallel capacitor and a parallel inductor connected together in parallel. Each of those resistors, capacitors and inductors may be considered a said impedance component.

Those of the series resistor, the series capacitor, the series inductor and the parallel network of impedances present in the target equivalent circuit may be connected in series, for example where the second electrical quantity is the voltage across the target output impedance.

The one or more configuration values may define the target equivalent circuit to comprise, optionally only, the series resistor, wherein the series resistor has a negative resistance (for example substantially equal in magnitude to the positive resistance of a voice coil of the electromechanical load).

The one or more configuration values may define the target equivalent circuit to comprise, optionally only, the series resistor and the series inductor connected together in series, wherein the series resistor has a negative resistance (for example substantially equal in magnitude to the positive resistance of a voice coil of the electromechanical load) and the series inductor has a negative inductance (for example substantially equal in magnitude to the positive inductance of a voice coil of the electromechanical load).

The one or more configuration values may define the target equivalent circuit to comprise, optionally only, the series resistor and the series inductor connected together in series and to the parallel network of impedances, wherein the series resistor has a negative resistance and the series inductor has a negative inductance, and wherein the parallel network of impedances comprises the parallel resistor, the parallel capacitor and the parallel inductor connected together in parallel.

The one or more configuration values may define the target equivalent circuit to comprise, optionally only, the series resistor and the series capacitor connected together in series, wherein the series resistor has a negative resistance and the series capacitor has a positive capacitance.

The one or more configuration values may define the target equivalent circuit to comprise, optionally only, the series resistor, wherein the series resistor has a positive resistance, and wherein the positive resistance is substantially larger than a resistance of the electromechanical load, or than a resistance of a resistor in an electromechanical-load equivalent circuit representing a mechanical impedance of the electromechanical load.

The driver circuitry may comprise a controller. The controller may be configured to generate the reference signal based on a drive input signal and based on a current drawn by the electromechanical load and/or a voltage across the electromechanical load. The controller may be configured to control, based on said current drawn by the electromechanical load and/or said voltage across the electromechanical load, a definition of the target output impedance to cause a performance such as a mechanical performance of the electromechanical load to meet a performance target. The controller may be configured to control, based on said current drawn by the electromechanical load and/or said voltage across the electromechanical load, a definition of the target output impedance to cause the target output impedance to cancel an impedance of at least one electrical component of the electromechanical load, optionally a coil such as a voice coil. The controller may be configured to control a definition of the target output impedance based on an impedance control signal to cause a performance of the driver circuitry to vary with the impedance control signal.

The driver may be configured to generate the drive output signal so that the drive output signal has a predefined relationship with a summation of the adjustment signal and the reference signal.

The function block may be configured to generate a control signal having a predefined relationship with a summation of the adjustment signal and the reference signal. The driver may be configured to generate the drive output signal so that the drive output signal has a predefined relationship with the control signal.

The driver circuitry may be selectively operable in an impedance-drive mode or a current-drive mode. When the driver circuitry is in the impedance-drive mode, the control signal is generated based on the reference signal and the adjustment signal so that the drive output signal behaves as if the output impedance of the driver circuitry has been adjusted to comprise the target output impedance (as mentioned earlier). In the current-drive mode, the function block may be configured to generate the control signal as a function of a current-control reference signal and a current drawn by the electromechanical load, and to adjust the control signal based on said current drawn by the electromechanical load so that said current drawn by the electromechanical load has a predefined relationship with the current-control reference signal.

At least one of the control signal and the adjustment signal may be a digital signal. The control signal and the adjustment signal may be digital signals, and the function block may be a digital function block (e.g. implemented in digital hardware, or in software running on a processor). The drive output signal may be referred to as an analogue signal.

The control signal may be a digital signal. The driver may comprise a digital-to-analogue converter and an analogue amplifier connected together to convert the control signal into an analogue signal and then amplify that analogue signal to form the drive output signal.

The driver circuitry may comprise a monitoring unit configured to generate a current monitoring signal indicative of a current drawn by the electromechanical load and/or a voltage monitoring signal indicative of a voltage across the electromechanical load. The function block may be configured to digitally determine the adjustment signal based on the current monitoring signal and/or the voltage monitoring signal.

The reference signal may be indicative of an intended mechanical performance of the electromechanical load. The behaviour of the drive output signal as if the output impedance of the driver circuitry has been adjusted to comprise the target output impedance may be relative to an expected behaviour of an expected drive output signal expected to be generated by the driver based on the reference signal without the adjustment signal (or based on the adjustment signal having a zero value). The driver circuitry may comprise one or more analogue impedance components connected to contribute to the output impedance of the driver circuitry. The target output impedance may be configured to cancel an impedance of at least one electrical component of the electromechanical load, optionally a coil such as a voice coil. The electromechanical load may be an electromechanical device such as an actuator. The electromechanical load may be a resonant electromechanical load such as a linear resonant actuator, a speaker or a microspeaker.

It may be considered that the driver forms part of a first control loop operable to control the drive output signal based on the reference signal. The driver and the function block may be considered to form part of a second control loop operable to control the drive output signal based on a current drawn by the electromechanical load and/or a voltage across the electromechanical load. The second control loop may be configured to have a lower latency than the first control loop.

At least part of the first control loop and at least part of the second control loop may be implemented as digital circuitry. The latencies of the first and second control loops may be defined by sample rates of respective digital signals of the first and second control loops.

The driver circuitry may comprise an analogue impedance configured to form part of the output impedance of the driver circuitry. The analogue impedance may be a controllable analogue impedance and the function block may be configured to control the controllable analogue impedance to adjust the output impedance of the driver circuitry. For example, the driver circuitry may be configured to control a definition of the target output impedance and/or an impedance of the analogue impedance to control the output impedance of the driver circuitry.

The driver circuitry may be implemented as integrated circuitry such as on an IC chip.

According to a second aspect of the present disclosure, there is provided an IC chip comprising the driver circuitry according to the aforementioned first aspect of the present disclosure.

According to a third aspect of the present disclosure, there is provided a control system, comprising: the driver circuitry according to the aforementioned first aspect of the present disclosure; and the electromechanical load, wherein the electromechanical load is connected to be driven by said drive output signal.

According to a fourth aspect of the present disclosure, there is provided a haptic system comprising the control system of the aforementioned third aspect of the present disclosure, wherein the electromechanical load is a linear resonant actuator (or other type of actuator) coupled to a physical structure or surface of the system to produce a haptic effect for a user.

According to a fifth aspect of the present disclosure, there is provided a host device, such as portable electrical or electronic device, comprising the driver circuitry according to the aforementioned first aspect of the present disclosure, or the IC chip of the aforementioned second aspect of the present disclosure, or the control system of the aforementioned third aspect of the present disclosure or the haptic system of the aforementioned fourth aspect of the present disclosure.

According to a sixth aspect of the present disclosure, there is provided a method carried out by driver circuitry to drive an electromechanical load with a drive output signal based on a digital reference signal, the drive output signal inducing a first electrical quantity at the electromechanical load, the method comprising: based on said first electrical quantity, digitally determining at a second sample rate higher than the first sample rate an adjustment signal indicative of a second electrical quantity which would be induced at a target output impedance of the driver circuitry due to said first electrical quantity; and generating the drive output signal based on the reference signal and the adjustment signal to cause the drive output signal to behave as if an output impedance of the driver circuitry has been adjusted to comprise the target output impedance, wherein the first electrical quantity is a current and the second electrical quantity is a voltage, or vice versa.

According to a seventh aspect of the present disclosure, there is provided driver circuitry for driving an electromechanical load with a drive output signal, the driver circuitry comprising: a first control loop operable to control the drive output signal based on a drive input signal; and a second control loop operable to control the drive output signal based on a current flowing through and/or a voltage induced across the electromechanical load, wherein the second control loop is configured to have a lower latency than the first control loop.

The second control loop may be configured to control the drive output signal to compensate for an impedance of the electromechanical load. The second control loop may be configured to control the drive output signal so that it behaves as if an output impedance of the driver circuitry has been adjusted to comprise a target output impedance.

The drive output signal may be a voltage signal and the second control loop may be configured to perform its control of the drive output signal based on a voltage signal which would be induced across the target output impedance by said current. The second control loop may be configured to determine, based on said current, an adjustment signal indicative of said voltage signal, and control the drive output signal based on the adjustment signal.

The drive output signal may be a current signal and the second control loop may be configured to perform its control of the drive output signal based on a current signal of a current which would be induced to flow through the target output impedance by said voltage. The second control loop may be configured to determine, based on said voltage, an adjustment signal indicative of said current signal, and control the drive output signal based on the adjustment signal.

According to an eighth aspect of the present disclosure, there is provided driver circuitry for driving an electromechanical load with a drive output signal based on a reference signal, the drive output signal inducing a first electrical quantity at the electromechanical load, the driver circuitry comprising: a function block configured, based on said first electrical quantity, to digitally determine an adjustment signal indicative of a second electrical quantity which would be induced at a target output impedance of the driver circuitry due to said first electrical quantity; and a driver configured to generate the drive output signal based on the reference signal and the adjustment signal to cause the drive output signal to behave as if an output impedance of the driver circuitry has been adjusted to comprise the target output impedance.

The drive output signal may be a voltage signal. In that case, the first electrical quantity may be a current drawn by the electromechanical load and the second electrical quantity may be a voltage across the target output impedance.

The drive output signal may be a current signal. In that case, the first electrical quantity may be a voltage across the electromechanical load and the second electrical quantity may be a current drawn by the target output impedance.

According to a ninth aspect of the present disclosure, there is provided driver circuitry for driving an electromechanical load with a drive output signal based on a reference signal, the drive output signal being a voltage signal and causing a current to be drawn by the electromechanical load, the driver circuitry comprising: a function block configured, based on said current, to digitally determine an adjustment signal indicative of a voltage signal which would be induced across a target output impedance of the driver circuitry by said current; and a driver configured to generate the drive output signal based on the reference signal and the adjustment signal to cause the drive output signal to behave as if an output impedance of the driver circuitry has been adjusted to comprise the target output impedance.

According to a tenth aspect of the present disclosure, there is provided driver circuitry for driving a linear resonant actuator, the driver circuitry comprising: a function block configured to generate a digital control signal as a function of a digital reference signal, intended for controlling the linear resonant actuator, and a monitor signal; and a driver configured to convert the digital control signal into an analogue drive signal to drive the linear resonant actuator, wherein: the monitor signal is indicative of a current flowing through, and/or a voltage across, the linear resonant actuator; and the function block is configured, based on the monitor signal, to control a difference between the digital control signal and the digital reference signal so that the analogue drive signal when driving the linear resonant actuator has a target behaviour in which the analogue drive signal behaves, relative to an expected analogue drive signal expected to be generated with the digital control signal being the digital reference signal, as if the output impedance of the driver circuitry has been adjusted to comprise a target output impedance.

According to an eleventh aspect of the present disclosure, there is provided driver circuitry for driving an electromechanical load with a drive output signal based on a reference signal, the driver circuitry configured to generate the drive output signal based on a digital operation dependent on the reference signal and an electrical quantity induced at the electromechanical load to cause the drive output signal to behave as if an output impedance of the driver circuitry has been adjusted to comprise a target output impedance.

According to a twelfth aspect of the present disclosure, there is provided driver circuitry for driving an electromechanical load with a drive output signal based on a reference signal, the drive output signal inducing a first electrical quantity at the electromechanical load, the driver circuitry comprising: a function block configured, based on said first electrical quantity, to digitally determine an adjustment signal indicative of a second electrical quantity which would be induced at a target output impedance of the driver circuitry due to said first electrical quantity; and a driver configured to generate the drive output signal based on the reference signal and the adjustment signal to cause the drive output signal to behave as if an output impedance of the driver circuitry has been adjusted to comprise the target output impedance.

According to a thirteenth aspect of the present disclosure, there is provided driver circuitry for driving an electromechanical load with a drive output signal based on a reference signal, the driver circuitry configured to digitally control the drive output signal based on the reference signal to cause the drive output signal to behave as if an output impedance of the driver circuitry has been adjusted to comprise a defined or predetermined target output impedance.

According to a fourteenth aspect of the present disclosure, there is provided driver circuitry for driving an electromechanical load with a drive output signal based on a reference signal, the driver circuitry configured to digitally control the drive output signal based on the reference signal and (a feedback signal indicative of) an electrical quantity at the electromechanical load (responsive to the drive output signal) to cause the drive output signal to behave as if an output impedance of the driver circuitry has been adjusted to comprise a defined or predetermined target output impedance.

Method and computer program aspects are envisaged corresponding to the circuitry aspects. IC chip, control system, haptic system and host device system aspects are envisaged for each of the driver circuitry aspects, analogous to those specified above in relation to the first aspect.

BRIEF DESCRIPTION OF THE DRAWINGS

Reference will now be made, by way of example only, to the accompanying drawings, of which:

FIG. 1 is a schematic diagram of an equivalent circuit representing driver circuitry driving an LRA under open loop control;

FIG. 4 is a schematic diagram of driver circuitry according to an embodiment;

DETAILED DESCRIPTION

Figure 2:
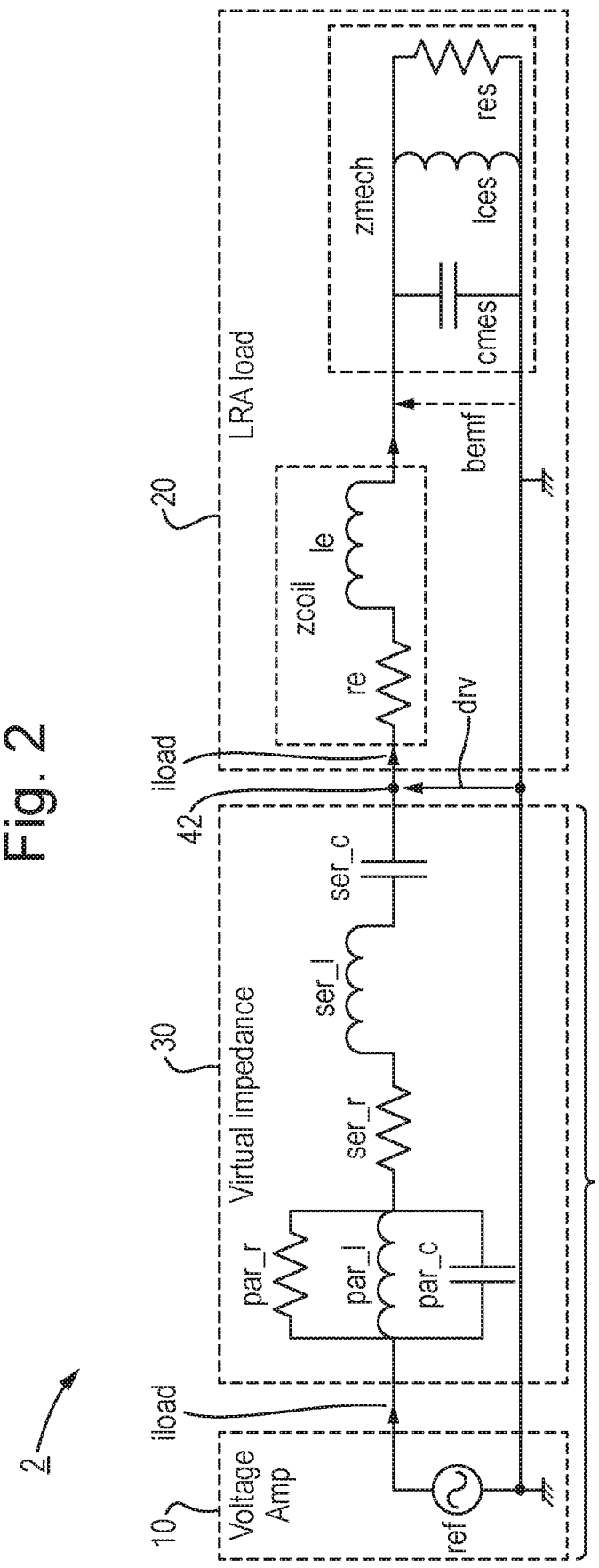
FIG. 2 is a schematic diagram of an equivalent circuit corresponding to that of FIG. 1, but including a target output impedance.

Before introducing embodiments, the operation of an LRA will be considered in more detail. As above, an LRA is merely one convenient type of electromechanical load or electromechanical device, particularly of interest when haptic systems are considered. It will be understood that the teachings herein apply to driving electromechanical loads in general, for example other types of actuator useful in haptic systems.

When an LRA is driven with a voltage across its two electrical terminals a current flows through or is drawn by the voice coil (an inductor) producing an electromotive force (EMF) on the moveable magnetic mass and thus controlling its motion. The moveable magnetic mass is connected to a spring which thus also affects its motion. The moving magnetic mass in turn produces a back EMF (bemf) voltage proportional to its velocity, which is reflected at the electrical terminals. The setup is akin to a driven (damped) harmonic oscillator.

With this in mind it is helpful to consider the driving of an LRA in electrical terms. FIG. 1 is a schematic diagram of an equivalent circuit 1 of driver circuitry driving an LRA under open loop control, along with a graph and equations useful for understanding its operation.

The equivalent circuit 1 of FIG. 1 comprises an AC voltage source (voltage amplifier) 10, modelling the driver circuitry, connected to an LRA (electromechanical) load 20, modelling the LRA. The LRA load 20 will be referred to merely as LRA 20 herein for simplicity. The AC voltage source 10 produces a reference voltage ref (driving signal) which appears across the LRA 20 and induces a load current iload to be drawn by the LRA 20.

The LRA 20 comprises a coil impedance zcoil, which models the voice coil, and a mechanical impedance zmech, which models the moveable mass and spring arrangement. The coil impedance zcoil is modelled as an inductance le in series with a resistance re. The mechanical impedance zmech appears in series with the coil impedance zcoil and is modelled as a parallel network of a capacitance cmes, an inductance lces and a resistance res. The capacitance cmes models the magnetic mass, the inductance lces models the spring and the resistance res models the mechanical damping. The bemf voltage appears across the mechanical impedance zmech as indicated (recall it is induced by the moving magnetic mass).

The user haptic experience is defined by sensing the motion of the moving mass, and in particular the force generated by its acceleration (recall Newton's second law, F=ma). It is desirable therefore to control the acceleration of the moving mass, or a proxy such as the position or velocity of the moving mass (based on which the acceleration can be controlled). It is desirable in particular to control the acceleration to produce one or more of: a) crisp haptic effects (e.g. fast acceleration and braking of the mass, e.g. to simulate clicks or button presses); b) wide bandwidth effects (e.g. for audio-to-haptics or to replicate textures); and c) consistent effects (e.g. from LRA to LRA, or over changing environmental conditions). It is desirable to sharpen the onset of the LRA's response to haptic input pulses and to reduce ringing of the LRA (and e.g. smartphone screen in the context of surface audio/haptic applications) after the haptic input pulse has stopped.

The bemf voltage is proportional to the velocity of the moving mass as mentioned above, however the control by the driver circuitry as in FIG. 1 controls the reference voltage ref rather than the bemf voltage itself. Such open loop voltage drive produces the highly resonant performance indicated by the graph in FIG. 1.

In particular, the ref-to-bemf transfer function (bemfTF) of the driven LRA load is set by the voltage divider defined by zcoil and zmech as apparent from the equivalent circuit of FIG. 1. Similarly, the load current transfer function (iloadTF) is set by the series connection of zcoil and zmech. These relationships are expressed in the equations in FIG. 1, where zmech is represented as zBemf and zcoil is represented as zCoil.

Because the mechanical system is resonant with high Q (quality factor), and the mechanical impedance is a lot smaller than the coil impedance (i.e. zmech»zcoil), the ref-to-bemf transfer function bemfTF has a very narrow bandwidth. The velocity effectively follows zmech (expressed as zBemf) away from resonance (where zbemf«zcoil) and such driving is in practice only useful for simple vibration effects. To produce much acceleration the vibration frequency needs to be close to the resonant frequency.

The present inventors have considered modifying the AC voltage source 10 by adjusting its output impedance to affect control of the LRA 20 and in particular the bemf voltage.

FIG. 2 is a schematic diagram of an equivalent circuit 2 corresponding to equivalent circuit 1, except that a target output impedance 30 has been interposed between the AC voltage source (voltage amplifier) 10 and the LRA 20. The combination of the AC voltage source 10 and the target output impedance 30 is then referred to as modified driver circuitry 40, whose drive output signal, drive voltage drv (driving signal), is provided at an output node 42 (between node 42 and ground) located between the modified driver circuitry 40 and the LRA load 20 to drive the LRA load 20 as indicated, based on the reference signal ref. Note that the target output impedance 30 is referred to in FIG. 2 as a "virtual" impedance (as discussed in more detail later), and is provided along a current path which carries the load current iload which flows through or is drawn by the LRA 20 based on the drive voltage drv (drive output signal).

It is assumed in FIG. 2 that the AC voltage source 10 itself is ideal (i.e. with zero output impedance). Thus, the target output impedance 30 may be considered the output impedance of the modified driver circuitry 40. Of course, in a practical implementation the AC voltage source 10 may be non-ideal (i.e. with some, albeit small, output impedance of its own). In that case, the target output impedance 30 may be considered part of (e.g. a substantial or dominant part of) the output impedance of the modified driver circuitry 40. This may be represented in FIG. 2 by some additional impedance (not shown) in series between the AC voltage source 10 and the target output impedance 30 which may be taken account of when determining a desired target output impedance 30.

The target output impedance 30 is presented in equivalent-circuit form in the equivalent circuit 2 as comprising a series resistance ser_r, a series capacitance ser_c, a series inductance ser_l and a parallel network of impedances, connected together in series. The parallel network of impedances comprises a parallel resistance par_r, a parallel capacitance par_c and a parallel inductance par_l, connected together in parallel.

The target output impedance 30 is presented in FIG. 2 as comprising all of these impedances as one example of how complex the target output impedance may be. However, the inventors have considered variants in which some of these impedances are effectively or actually not present (e.g. are shorted or removed) to define a less complex target output impedance 30.

A number of such variants are presented in FIGS. 3A to 3E as examples. Each of the variants may be considered to be a particular configuration of the target output impedance 30 of FIG. 2.

Figure 3A:
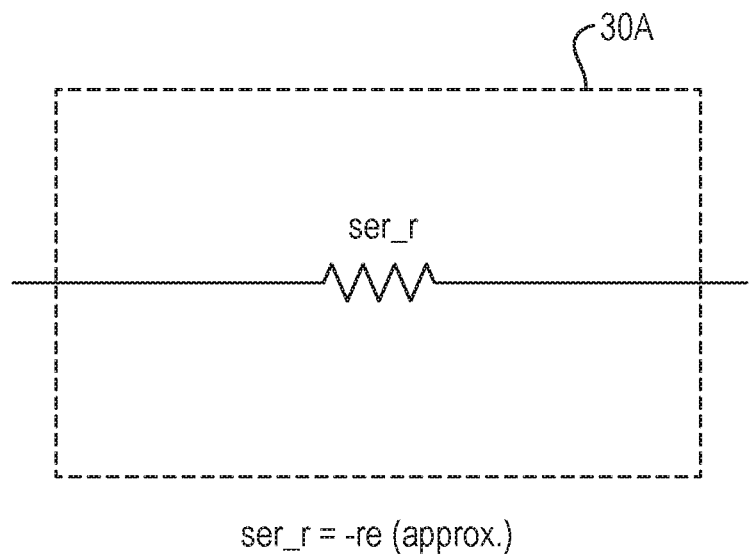
FIGS. 3A to 3E are schematic diagrams of equivalent circuits representing particular configurations of the target output impedance of FIG. 2.

FIG. 3A is a schematic diagram of an equivalent circuit of a target output impedance 30A, being a variant of the target output impedance 30 which comprises only the series resistance ser_r. If the target output impedance 30 in FIG. 2 were replaced with (or configured to form) the target output impedance 30A, and the series resistance ser_r were given the value −re (a negative resistance), it can be seen from FIG. 2 that the series resistance ser_r would then 'cancel out' the series resistance re of the coil impedance zcoil (as if neither resistance were present). The implementation of such a negative resistance will be explained later.

At low frequencies (e.g. <1 kHz) the inductance le of the coil impedance zcoil may be negligible and be assumed to be shorted. In that case, as apparent from FIG. 2, the reference voltage ref would appear across the mechanical impedance zmech such that the bemf voltage follows the reference voltage ref. This enables control of the bemf voltage itself with the reference voltage ref, and thus of the velocity of the magnetic mass of the LRA (and hence its acceleration and the force or haptic effect generated by that acceleration). For example, the reference voltage ref may take the form of a haptic signal with the modified driver circuitry 40 having the target output impedance 30A enabling wider bandwidth control of the velocity (or position or acceleration) of the LRA mass to create interesting haptic effects.

Incidentally, it is noted in FIG. 3A that it may be desirable to give the series resistance ser_r a value which is approximately (e.g. up to 5% or around 1% off) −re. This arises from an example where, in order to achieve a damping factor zeta_lra of the LRA equal to 1 (i.e. for the LRA to be critically damped), it was determined that ser_r should be set to have a value which is approximately 99% of −re. The skilled person will appreciate that in a given application a value of ser_r which achieves critical damping could be found. Where the value −re is used later herein, it will be understood that this value could be adjusted to achieve critical damping in some arrangements. Critical damping is desirable to sharpen the onset of haptic pulses in the LRA (driven by way of the reference signal ref) and to reduce ringing of the LRA after the haptic pulse in the reference signal ref has stopped.

Figure 3B:
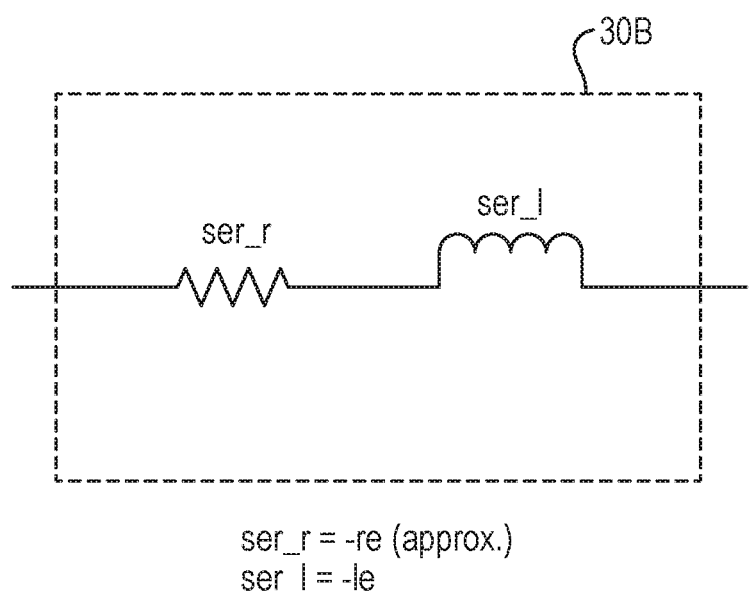

FIG. 3B is a schematic diagram of an equivalent circuit of a target output impedance 30B, being a variant of the target output impedance 30 which comprises only the series resistance ser_r and the series inductance ser_I. If the target output impedance 30 in FIG. 2 were replaced with (or configured to form) the target output impedance 30B, and the series resistance ser_r and series inductance ser_I given respective values −re and −le (negative resistance and inductance), it can be seen from FIG. 2 that the target output impedance 30B would then 'cancel out' the coil impedance zcoil, even where the inductance le cannot be ignored at low frequencies. As apparent from FIG. 2, the reference voltage ref would again appear across the mechanical impedance zmech with the bemf voltage following the reference voltage ref (but over a larger bandwidth than with the target output impedance 30A).

Figure 3C:
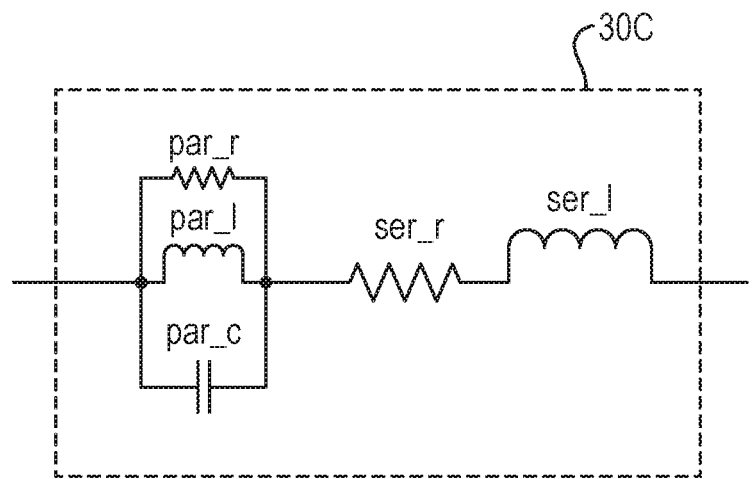

FIG. 3C is a schematic diagram of an equivalent circuit of a target output impedance 30C, being a variant of the target output impedance 30 in which the series capacitance ser_c has been omitted. In this case, it can be appreciated that the types of impedance and their interconnection in the target output impedance 30C somewhat "mirror" those of the LRA 20.

If the target output impedance 30 in FIG. 2 were replaced with (or configured to form) the target output impedance 30C, with the series resistance ser_r and the series inductance ser_I given respective values −re and −le (negative resistance and inductance), again those components would cancel out the coil impedance zcoil as for the target output impedance 30B. The parallel RLC section of the target output impedance 30C, i.e. the parallel resistance par_r, parallel capacitance par_c and parallel inductance par_I, may then be used to cause the mechanical impedance zmech to appear differently in electrical terms to the AC voltage source 10, i.e. to effectively synthesise a desired LRA load.

Figure 3D:
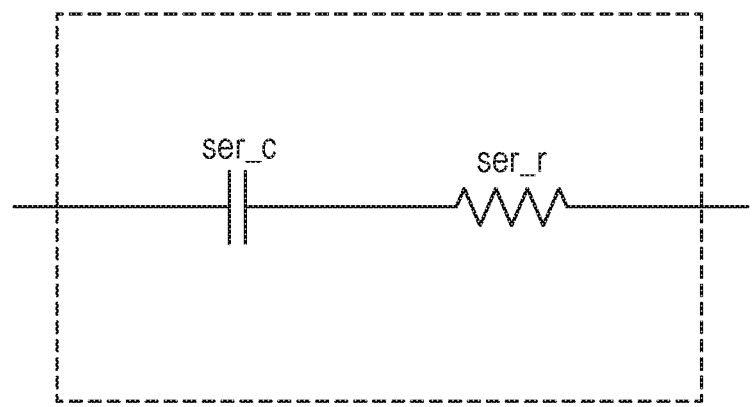

FIG. 3D is a schematic diagram of an equivalent circuit of a target output impedance 30D, being a variant of the target output impedance 30 which comprises only the series resistance ser_r and the series capacitance ser_c. If the target output impedance 30 in FIG. 2 were replaced with (or configured to form) the target output impedance 30D, and the series resistance ser_r were given the value −re (a negative resistance) as before, again the series resistance ser_r would 'cancel out' the series resistance re of the coil impedance zcoil (as if neither resistance were present). The series capacitance ser_c and the inductance le of the coil impedance zcoil then effectively form an LC tank in series with the mechanical impedance zmech, which can increase damping to bring the magnetic mass of the LRA to a stop faster.

Figure 3E:
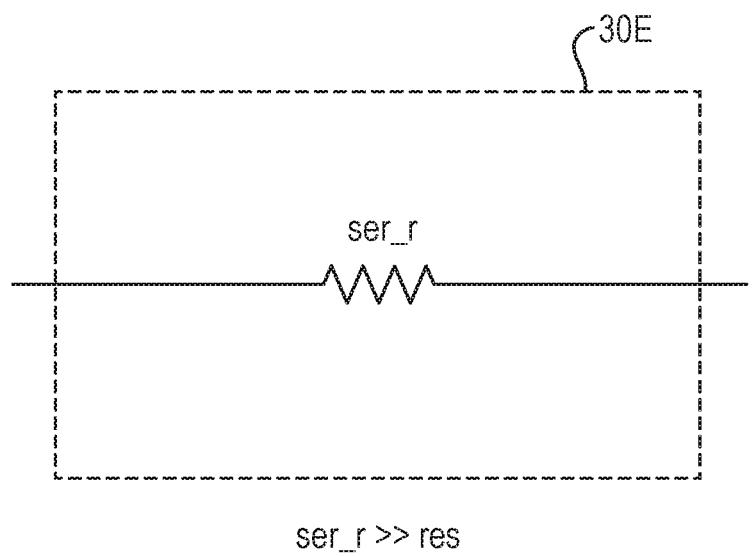

FIG. 3E is a schematic diagram of an equivalent circuit of a target output impedance 30E being a variant of the target output impedance 30 in which it comprises only the series resistance ser_r as in FIG. 3A but where the series resistance ser_r is given a value which is much bigger (e.g. >10 times bigger) than the resistance res of the mechanical impedance zmech (e.g. ser_r»res and even ser_r»re). In this arrangement, the position of the magnetic mass of the LRA is proportional to the reference voltage ref at frequencies below resonance and its acceleration is proportional to the reference voltage ref at frequencies above resonance.

Against this backdrop, FIG. 4 is a schematic diagram of driver circuitry 40A for driving the LRA 20, according to an embodiment. It will become apparent that the driver circuitry 40A implements a number of control loops.

The driver circuitry 40A comprises a function block 50, a driver 60 and a controller 70.

The controller 70 is optional—it may for example be provided separately from the driver circuitry 40A (the function block 50 and driver 60) in some applications. The combination of the function block 50, driver 60 and controller 70 corresponds to the modified circuitry 40 and thus outputs its drive output signal to the LRA 20 at an output node 42 for consistency with FIG. 2. The driver circuitry 40A is shown connected at the output node 42 to drive the LRA 20 for convenience, but it will be understood that the driver circuitry 40A need not actually comprise the LRA 20 (the LRA 20 may be provided separately for connection to the driver circuitry 40A).

In general, for convenience, digital signals will be denoted in the following using block capitals (e.g. MON) and analogue signals will be denoted in lower case (e.g. mon).

The function block 50 is configured to generate a (digital) control signal CS as a function of a (digital) reference signal RS and a (digital) monitor signal MON (which—although not shown —may be generated from a corresponding analogue monitor signal mon). The reference signal RS is generated by the controller 70 and is intended for controlling the LRA 20. For example, the reference signal RS may exhibit haptic pulses to be used to control the LRA 20. The reference signal RS may be indicative of (e.g. proportional to, directly proportional to, or have a predefined, defined, or linear relationship with) an intended mechanical performance of the LRA 20 (electromechanical load). In this sense, the controller 70 and the reference signal RS may be compared with the driver circuitry 40 and the reference voltage ref, respectively.

The driver 60 is configured to convert the control signal CS into an (analogue) drive output signal dos (a voltage signal) which is output via the output node 42 to drive the LRA 20. The LRA 20 draws the load current iload due to the drive output signal dos. The load current iload is thus the current (flowing) through the LRA 20. One or more of the reference signal RS (including any signal based on which the reference signal RS is generated), control signal CS and drive output signal dos may be referred to as an actuating signal. It is recalled that the LRA 20 is an example of an electromechanical load or electromechanical device. The driver 60 may comprise a digital-to-analogue converter (not shown) to convert the digital control signal CS into an analogue control signal cs and an amplifier (also not shown) to amplify the analogue control signal cs to generate the analogue drive output signal dos.

The monitor signal MON may comprise a current monitor signal IMON which is indicative of (e.g. proportional to, directly proportional to, or has a predefined, defined or linear relationship with) the load current iload flowing through or drawn by the LRA 20. The monitor signal MON may (additionally or alternatively) comprise a voltage monitor signal VMON which is indicative of (e.g. proportional to, directly proportional to, or has a predefined, defined or linear relationship with) a voltage induced across the LRA 20 due to the current flowing through the LRA 20 (effectively, the drive output signal dos where this is applied simply across the LRA 20). As such, the driver circuitry 40A may comprise monitoring circuitry 80 to monitor the current flowing through (and optionally also the voltage across) the LRA 20 and generate the monitor signal MON (or its analogue equivalent mon).

It is emphasised that the monitoring circuitry 80 need not be part of (e.g. housed within) the LRA 20 and indeed may be considered separate from the LRA 20 so that the LRA 20 may be provided without needing any sensing technology (i.e. it may be a "sensorless" LRA). This will become more apparent in connection with FIG. 5 described below.

As indicated schematically in respect of the controller 70, the controller 70 is configured to generate the reference signal RS based on a drive input signal DIS. The drive input signal DIS may be generated within the controller 70 or received from a separate system or controller (e.g. from an applications processor). The drive input signal DIS may be generated within the controller 70 based on one or more received signals, e.g. from a separate system or controller (e.g. from an applications processor).

The controller 70 may be configured to receive the monitor signal MON or part thereof, and to control one or more of its signals based on the monitor signal MON or part thereof. For example, the controller 70 may be configured to receive the current monitor signal IMON and/or the voltage monitor signal VMON and to control one or more of the signals which it generates based on the current monitor signal IMON and/or the voltage monitor signal VMON.

The controller 70 may be configured to generate the reference signal RS based on the current monitor signal IMON and/or the voltage monitor signal VMON. The current monitor signal IMON and/or the voltage monitor signal VMON may for example be indicative of the performance of the LRA 20, such as its mechanical performance. The current monitor signal IMON and the voltage monitor signal VMON may be used together to assess e.g. the onset of the LRA 20 response to haptic input pulses (expressed by the drive input signal DIS and/or the reference signal RS) or the degree of ringing of the LRA 20 after the haptic input pulse has stopped. The current monitor signal IMON and the voltage monitor signal VMON may be used together to assess e.g. the resonant frequency f0, quality factor Q, impedance and/or operational state (including failure states) of the LRA 20. The current monitor signal IMON and the voltage monitor signal VMON may for example be indicative of the effectiveness of the current (present or existing) configuration of the target output impedance 30, and indicate how that configuration should be varied to meet a performance target. The implementation of the target output impedance 30 in the driver circuitry 40A is described in more detail below.

In this way, a first control loop may be formed in which the drive output signal dos is controlled based on a drive input signal DIS. In such a control loop it can be understood that the monitor signal MON (the current monitor signal IMON and/or the voltage monitor signal VMON) serves as a feedback signal for feedback control (by the controller 70) of the reference signal RS and thus also of the control signal CS and the drive output signal dos. This feedback control may be used to keep the performance of the LRA 20 (as indicated by the current monitor signal IMON and/or the voltage monitor signal VMON, e.g. its mechanical performance) within performance limits.

The first control loop may also incorporate feedforward control (by the controller 70) of the reference signal RS and thus also of the control signal CS and the drive output signal dos. There are a multitude of possibilities, for example using high-pass filtering to remove lower-frequency components which may lead to low-efficiency driving of the LRA 20, or low-pass filtering to handle erroneous sounds that can be emitted by some real life mechanical integrations, or an audio-to-haptics analyser which converts audio content to haptic content. These are of course simply examples.

A second control loop may also be considered to be present, in which the drive output signal dos is controlled based on the monitor signal MON (the current monitor signal IMON and/or the voltage monitor signal VMON). In such a control loop it can be understood that the monitor signal MON (in particular, the current monitor signal IMON) serves as a feedback signal for feedback control (by the function block 50) of the control signal CS and thus also of the drive output signal dos. The control by the function block 50 will be described in more detail below.

A third control loop may also be considered to be present, in which the functionality of the function block 50 (described below) is controlled based on the monitor signal MON (the current monitor signal IMON and/or the voltage monitor signal VMON). In such a control loop it can be understood that the monitor signal MON (in particular, the current monitor signal IMON and the voltage monitor signal VMON) serves as a feedback signal for feedback control (by the controller 70) of a configuration signal CONFIG which is supplied to the function block 50 to define or affect or control its operation. As above, the control by the function block 50 will be described in more detail below.

A fourth control loop may also be considered to be present, in which the function of the driver 60 is controlled based on the monitor signal MON (the current monitor signal IMON and/or the voltage monitor signal VMON). In such a control loop it can be understood that the monitor signal MON (in particular, the voltage monitor signal VMON) serves as a feedback signal for feedback control (by the driver 60) of the drive output signal dos e.g. so that the drive output signal dos has a defined or predefined (e.g. linear, proportional or directly proportional) relationship with the control signal CS. This control may for example act to achieve linear operation of the driver 60 (which may be considered an amplifier).

It will become apparent that it may be desirable to operate the various control loops with different (relative) latencies. More particularly, for one or more of the control loops it may be desirable to have low latencies, e.g. so that analogue operation is closely simulated (across a bandwidth of interest—which may be e.g. a haptic or audio bandwidth as mentioned later), whereas for one or more others of the control loops it may be acceptable (or desirable, with power consumption and complexity in mind) to operate with higher latencies.

For example, the second control loop may have a lower latency than the first and/or third control loop. The fourth control loop may have a lower latency than the first and/or third control loop. The second control loop may have the same or substantially the same latency as the fourth control loop. The latencies of the control loops may be defined by sample rates (update rates, response rates) of respective digital signals of the control loops, as will become more apparent in connection with FIG. 5 (described below). The term latency here may thus describe how quickly (e.g. at what rates, speeds, or frequencies) a particular control loop responds to disturbances or control inputs.

The above control loops may be referred to as (or be considered to encompass) control paths or control systems or control networks. Each of the control loops may incorporate one or more of feedback control, feedforward control and open loop control.

In overview, the function block 50 controls a difference between the control signal CS and the reference signal RS so as to simulate the presence of an (analogue) target output impedance of the driver circuitry 40A corresponding to the target output impedance 30 of FIG. 2 (whose impedance value may be set to configure the target output impedance 30 as e.g. any of the target output impedances 30A to 30E). For convenience, the simulated target output impedance will be referred to simply as the target output impedance 30.

Because the function block 50 controls the difference between the control signal CS and the reference signal RS in the digital domain (i.e. digitally, using digital signals and digital operations/calculations), the relationship between the control signal CS and the reference signal RS can be configured (e.g. over time) to define and/or adjust the configuration of the target output impedance 30 (e.g. which of the target output impedances 30A to 30E is being used). In this way, the response of the LRA 20 to the reference signal RS can be controlled enabling the haptic effect (expressed by the reference signal RS) to be controlled in the case of a haptic system.

The function block 50 is configured, based on the monitor signal MON (in particular, the current monitor signal IMON), to digitally determine an adjustment signal AS indicative of a voltage signal which would be induced across the target output impedance 30 of the driver circuitry 40A by the load current iload (i.e. if the load current were to flow through the target output impedance 30). In effect, the function block 50 is configured to digitally determine (e.g. calculate) the adjustment signal AS based on the load current iload. The driver 60 is then configured to generate the drive output signal dos based on the reference signal RS and the adjustment signal AS (or based on the control signal CS, which itself is generated based on the reference signal RS and the adjustment signal AS) to cause the drive output signal dos to behave as if an output impedance of the driver circuitry has been adjusted to comprise the target output impedance 30.

In more detail, the function block 50 is configured, based on the monitor signal MON (in particular, the current monitor signal IMON), to control a relationship or difference between the control signal CS and the reference signal RS. In particular, the function block 50 controls the relationship so that the drive output signal dos (when driving the LRA 20) has a target behaviour in which the drive output signal dos behaves, relative to an expected analogue drive output signal expected to be generated with the control signal CS being the reference signal RS (i.e. when CS=RS), as if the output impedance of the driver circuitry has been configured or adapted or adjusted to comprise (or simply comprises) a target output impedance such as the target output impedance 30 (e.g. configured to form any of the variants 30A to 30E). The expected analogue drive output signal is expected to be generated if the driver 60 generates the drive output signal dos based on the reference signal RS without the adjustment signal AS (effectively without the control of the second control loop, which may be taken to comprise the adjustment signal AS).

Thus, the function block 50 adjusts the control signal CS relative to the reference signal RS so that driver circuitry 40A behaves as if its output impedance (measured at node 42) includes the target output impedance 30 (whereas it otherwise would not, i.e. when CS=RS). For example, where CS=RS the driver circuitry 40A may be able to operate with zero output impedance (measured at node 42) due to the operation of the driver 60, in which case the function block 50 adjusts CS relative to RS based on IMON so that the output impedance of the driver circuitry 40A is substantially equal to the target output impedance.

In this sense, the function block 50 simulates or emulates the presence of the target output impedance 30 by making an adjustment (by way of adjustment signal AS) in the signal path between the controller 70 and the driver 60 so that the output impedance of the driver circuitry 40A appears to (and indeed in effect does) comprise the target output impedance 30. The target output impedance 30 in these terms may be considered a "virtual" impedance as mentioned earlier in that it is not implemented by providing analogue discrete passive impedance components, but by virtue of signal adjustments determined in the digital domain (i.e. made or determined digitally).

For example, the function block 50 may be configured to receive and/or store one or more configuration values which define the target output impedance, and thus govern how the control signal CS is generated as a function of the reference signal RS and the current monitor signal IMON. The configuration values may be set based on the (digital) configuration signal CONFIG received from the controller 70, as indicated in FIG. 4, by virtue of the third control loop.

Incidentally, the (digital) configuration signal CONFIG may be controlled by a separate impedance control signal (not shown), e.g. received from a separate system, either instead of or in addition to control by virtue of the third control loop. The configuration of the target output impedance may thus vary with (or be controlled by or be set by) the separate impedance control signal in this way.

Returning to FIG. 4, a useful example to appreciate the "virtual" aspect of the target output impedance 30 is where the target output impedance 30 is configured to form the target output impedance 30A with its resistance ser_r having the value —re (i.e. a negative resistance) as mentioned earlier. Looking at FIG. 2, such a target output impedance 30A (negative resistance) could be expected to have a voltage rise (rather than drop) across it in the direction from the driver circuitry 40 to the LRA load 20 which is defined by the product of the resistance value re and the load current iload flowing through the LRA load 20 in that direction (recall Ohm's law, V=IR).

Thus, in this example the function block 50 simulates the presence of the target output impedance 30A between the controller 70 and the driver 60 by adding an amount represented by the adjustment signal AS (based on the product of the resistance value re and the load current iload flowing through or drawn by the LRA load 20, as indicated by the current monitor signal IMON) to the reference signal RS to form the control signal CS (i.e. CS=RS+AS), so that the output impedance of the driver circuitry 40A appears to (and in effect does) comprise the target output impedance 30A.

In this case, the adjustment signal AS could be considered to be a function of iload*re or IMON*re. In this way, the function block 50 enables a negative resistance to be implemented digitally. The CONFIG signal may for example simply provide the function block 50 with the value –re (or re) to define the series resistance ser_r, possibly along with other configuration values which define the target output impedance 30 as being of the form of (or configured as) the target output impedance 30A (rather than e.g. the target output impedance 30C).

The drive output signal dos is a voltage signal which appears across the LRA 20. The target behaviour can then be defined by how a voltage level of the drive output signal dos varies when driving the LRA 20 (or a voltage across the LRA 20) with the current flowing through the LRA 20 (i.e. the load current iload).

Incidentally, in the FIG. 4 embodiment the control signal CS, reference signal RS, adjustment signal AS and monitor signal MON are presented as being digital signals as a convenient implementation which enables the function block 50 to be considered a (fully) digital block. However, the control signal CS, adjustment signal AS and reference signal RS could for example be replaced with analogue equivalent signals cs, as and rs, respectively. In this case, the function block 50 may digitally (e.g. by calculation or using a look-up table) work out how to adjust the analogue control signal cs relative to the analogue reference signal rs (i.e. what the adjustment signal as should be) to simulate or emulate the presence of the target output impedance 30. For example, the function block 50 may digitally generate (e.g. by calculation or using a look-up table, followed by digital-to-analogue conversion) a suitable analogue adjustment signal as to be added in the analogue domain to the analogue reference signal rs to generate the analogue control signal cs. It will be appreciated that by digitally working out how to adjust the analogue control signal cs relative to the analogue reference signal rs it is possible to implement the target output impedance 30 (including in the form of the target output impedance 30A with a negative resistance) in an efficient and highly adaptable manner.

For convenience, the example using the digital control signal CS, digital adjustment signal AS, digital reference signal RS and digital monitor signal MON will be carried forwards.

It was mentioned earlier that there may be one or more analogue output impedances (e.g. discrete or parasitic components) present in the driver circuitry 40A. The target output impedance 30 may be configured to take this into account. For example, if there is some analogue (positive) resistance of magnitude R1 (not shown) in the output impedance of the driver circuitry 40A, and it is desired that the output impedance of the driver circuitry 40A have an overall resistance of magnitude –R2 (a negative resistance), then the target output impedance 30 (assuming the FIG. 3A configuration) may be configured to take this into account by setting ser_r=–(R1+R2), i.e. configured to compensate for (or allow for) the analogue impedance R1.

As another example, the function block 50 may be configured to control an analogue variable impedance (a discrete component—not shown) in the current path of the load current iload, such as between the output node 42 and the driver 60, so that the output impedance of the driver circuitry 40A is controlled or adjusted in part with the variable impedance (an actual discrete impedance component). Again, the target output impedance 30 may be configured to take this into account, i.e. adjusted or configured to compensate for (or allow for) the variable impedance. For example, an impedance formed by (equivalent to) a combination of the variable impedance and the target output impedance 30 may be controlled.

Figure 5:
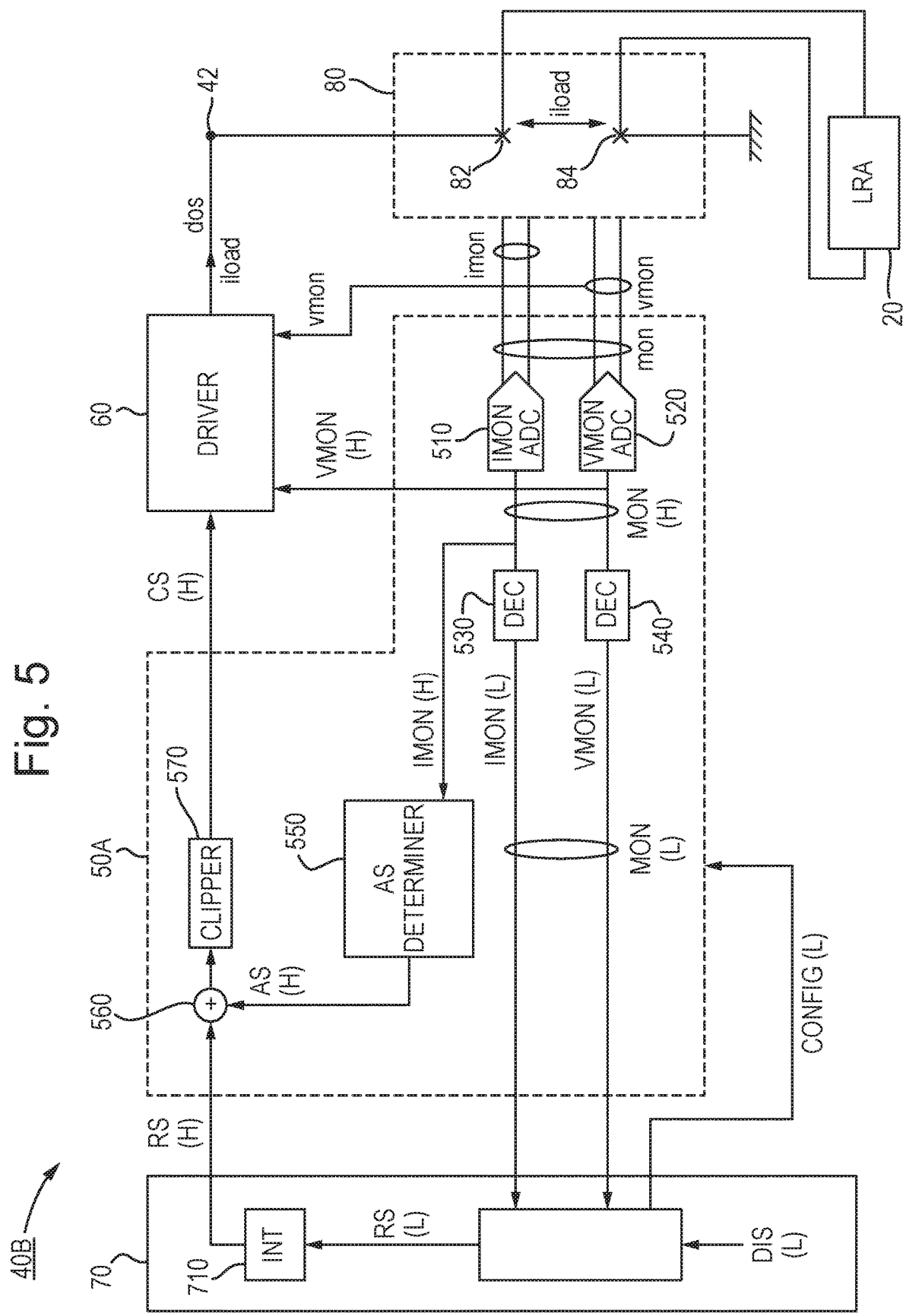
FIG. 5 is a schematic diagram of driver circuitry according to an embodiment.

FIG. 5 is a schematic diagram of driver circuitry 40B for driving the LRA 20, as a detailed example implementation of the driver circuitry 40A. Like elements and signals are denoted with like reference signs and duplicate description is omitted. The function block 50 is referred to as function block 50A in the FIG. 5 implementation.

It will become apparent that in the present detailed implementation some digital signals have a relatively high sample (update) rate and other digital signals have a relatively low sample (update) rate, and this is indicated with the suffixes "(H)" and "(L)", respectively. In this way, some signals and the corresponding control loops may be considered "fast" (or high bandwidth, or low latency) and some signals and the corresponding control loops may be considered "slow" (or low bandwidth, or high latency), as mentioned earlier. The signals with the low sample rate could be considered to have the same sample rate as one another, and the signals with the high sample rate could similarly be considered to have the same sample rate as one another, but this is not essential. Also, the various sample rates could be varied depending on the application and e.g. over time.

The function block 50A of the driver circuitry 40B comprises a current-monitoring ADC 510, a voltage-monitoring ADC 520, a current-monitoring decimator 530, a voltage-monitoring decimator 540, an adjustment signal (AS) determiner 550, an adder 560 and a clipper 570. The function block 50A is a digital block (except for analogue front-end portions of the ADCs 510 and 520), and may be implemented using "hardwired" circuitry, logic gates and/or a processor executing a computer program. For example, in some arrangements the function block 50A may be implemented as part of the controller 70, which may be a processor or microprocessor such as a digital signal processor (DSP). As such, the division of the function block 50A into interconnected component parts in FIG. 5 may be considered schematic and useful for understanding its function.

In some arrangements the controller 70 may be considered part of the driver circuitry 40B, e.g. provided as part of the same integrated circuitry as other elements of the driver circuitry 40B. In other arrangements, the controller 70 may be considered separate from the driver circuitry 40B, e.g. provided as separate integrated circuitry from integrated circuitry comprising other elements of the driver circuitry 40B.

It is assumed here that the monitoring circuitry 80 is configured to monitor the current flowing through the LRA 20 and output an analogue current-monitoring signal imon, and also to monitor the voltage across the LRA 20 and output an analogue voltage-monitoring signal vmon. It is also emphasised that the monitoring circuitry 80 may be separate from the LRA 20, with the LRA 20 in this case shown as being connected across terminals 82 and 84 of the monitoring circuitry 80 (which terminals 82 and 84 may be considered terminals of the driver circuitry 40B). Thus, the driver circuitry 40B including the monitoring circuitry 80 (but excluding the LRA 20) could be implemented as integrated circuitry, for example on an IC chip, with the terminals 82 and 84 being (external) terminals of the integrated circuitry.

As an example, the monitoring circuitry 80 may comprise a resistor (not shown) connected in series with the LRA 20 such as between nodes 42 and 82 (whose known resistance is taken into account when assessing the resistance re of the coil impedance zcoil), with a voltage across that resistor being proportional to the load current iload flowing through the LRA 20 and thus forming the current-monitoring signal imon. The voltage-monitoring signal vmon may be formed by a load voltage vload taken across the LRA 20, e.g. across terminals 82 and 84. Of course, there are other ways to obtain the signals vmon and imon in respect of the LRA 20.

The current-monitoring ADC 510 is connected to receive the analogue current-monitoring signal imon and output a corresponding digital current-monitoring signal IMON (H), i.e. having a high sample rate. The current-monitoring decimator 530 is connected to receive the current-monitoring signal IMON (H) and to output a corresponding digital current-monitoring signal IMON (L), i.e. having a low sample rate. The voltage-monitoring ADC 520 is connected to receive the analogue voltage-monitoring signal vmon and output a corresponding digital voltage-monitoring signal VMON (H), i.e. having a high sample rate. The voltage-monitoring decimator 540 is connected to receive the voltage-monitoring signal VMON (H) and to output a corresponding digital voltage-monitoring signal VMON (L), i.e. having a low sample rate. A decimator in this sense acts to reduce the sample rate between its input and output signals, e.g. by outputting one input sample per several input samples or averaging successive groups of samples.

The controller 70 is connected to receive the signals IMON (L) and VMON (L), the AS determiner 550 is connected to receive the signal IMON (H), and the driver 60 is connected to receive one or both of the signals vmon and VMON (H). It is assumed that the controller comprises an interpolator 710 which converts a digital reference signal RS (L), i.e. at a low sample rate, into a corresponding digital reference signal RS (H) at a high sample rate. An interpolator in this sense acts to increase the sample rate between its input and output signals, generating new samples by interpolation/estimation.

In overview, the function block 50A of the driver circuitry 40B is configured to determine, based on the monitor signal MON and one or more configuration values which define the target output impedance 30, the adjustment signal AS (H) to be applied to the reference signal RS (H) to form the control signal CS (H) and cause the drive output signal dos when driving the LRA 20 to have the target behaviour, and to generate the control signal CS (H) by applying the adjustment signal AS (H) to the reference signal RS (H). Note this forms part of the second control loop (which is fast, with low latency, using high sample (update) rate digital signals) so that the drive output signal dos behaves (over a wide bandwidth) as if the target output impedance 30 had been implemented in analogue form.

In detail, the AS determiner 550 is configured to generate the adjustment signal AS (H) based on the signal IMON (H) in a form to be added to the reference signal RS (H) to form the control signal CS (H). The adder 560 is configured to generate the control signal CS (H) by adding adjustment signal AS (H) to the reference signal RS (H). The control signal CS (H) is thus generated to have a defined or predefined (e.g. substantially linear, proportional or directly proportional) relationship with a summation of the adjustment signal AS (H) and the reference signal RS (H).

Effectively, the AS determiner 550 determines (e.g. by calculation or using a look-up table) a voltage which would be induced across the target output impedance 30 if the current flowing through the LRA 20 were to flow through the target output impedance 30, and generates the adjustment signal AS (H) to express this voltage so that adding the adjustment signal AS (H) to the reference signal RS (H) produces the control signal CS (H). Thus, the adjustment signal AS (H) may be considered as indicative of (e.g. proportional to, directly proportional to, or having a predefined, defined or linear relationship with) the load voltage vload which would be induced across the target output impedance 30 if the load current iload flowing through the LRA 20 were to flow through the target output impedance 30. In this way, the control signal CS (H) and thus the drive output signal dos will respond to the load current iload as if the output impedance of the driver circuitry 40B has been configured to comprise the target output impedance 30.

The clipper 570 serves to clip (i.e. keep within limits) the values of the control signal CS (H), e.g. so that its values are within a linear operation range of the driver 60 (e.g. of a DAC and/or analogue amplifier of the driver 60). The driver 60 is configured to control the drive output signal dos so that its voltage level has a defined or predefined (e.g. substantially linear, proportional or directly proportional) relationship with the control signal CS (H), by virtue of one or both of the signals VMON (H) and vmon as indicated, as part of the fourth control loop (which is fast similarly to the second control loop). The clipper 570 is optional in some arrangements.

Note that the controller 70 is connected to receive the monitor signal MON in the form of the digital current-monitoring signal IMON (L) and the voltage-monitoring signal VMON (L), both with the low sample rate. As such, the first control loop generates the reference signal RS (L) based on the drive input signal DIS (L) as indicated, acting as a relatively slow control loop. The interpolator 710 converts the reference signal RS (L) into the corresponding reference signal RS (H), for use in the second and fourth control loops which are fast control loops as already mentioned. Further, the third control loop generates the configuration signal CONFIG (L), i.e. with the low sample rate, for use by the function block 50A (in particular, the AS determiner 550) to define the target output impedance 30, i.e. by way of one or more configuration values, acting as a relatively slow control loop.

The first and third control loops may for example only need to respond to relatively slow (low frequency) disturbances, e.g. changes in temperature of the LRA 20. On the other hand, the second and fourth control loops may need very low latencies to simulate or emulate analogue performance (over a given bandwidth).

Looking further at the first and third control loops, it will be appreciated that the controller 70 has access to the monitor signal MON in the form of the digital current-monitoring signal IMON (L) and the voltage-monitoring signal VMON (L), as mentioned earlier. Based on these signals, the controller 70 may in some arrangements be configured to determine or estimate partly or fully the configuration of the LRA 20, e.g. to determine impedance values (or estimates thereof) of some or all of (see FIG. 2) the values re, Ie, cmes, Ices and res. The analysis of the digital current-monitoring signal IMON (L) and the voltage-monitoring signal VMON (L) may also enable a determination or estimation of the resonant frequency f0 or quality factor Q of the LRA 20.

This information can be used to define or update the configuration of the target output impedance 30 via the CONFIG (L) signal and/or to control parameters of the reference signal RS (L). An example may be determining or estimating the value of the coil resistance re (see FIG. 2) so as to set or update (e.g. improve) the value used for the series resistance ser_r of the target output impedance 30 (e.g. in the case of the FIG. 3A configuration). Another example is using the estimate or determined value of the resonant frequency f0 to control the reference signal RS (L) so that the LRA 20 is driven very efficiently in terms of power consumption (e.g. at resonance) by the drive output signal dos.

Of course, some of this defining/updating/controlling may be based on pre-set values or input control signals (e.g. received from another system or a user). The present disclosure will be understood accordingly. For example, values for the resonant frequency f0 and/or quality factor Q of the LRA 20 may be preset or provided from an external system via a control signal.

Merely as examples, the relatively high sample (update) rates indicated with the suffix (H) could be at 768 kHz (768000 samples per second) and the relatively low sample (update) rates indicated with the suffix (L) could be at 48 kHz (48000 samples per second). For example, the signals RS (H), AS (H), IMON (H), VMON (H) and CS (H) could be 768 kHz digital signals, whereas the signals RS (L), IMON (L) and VMON (L) could be 48 kHz digital signals. The signal CONFIG (L) might be a 48 kHz signal, or might have an even lower sample rate (e.g. in the range 1 kHz to 48 kHz, such as 3 kHz). Other sample rates (cf. audio signals) for the relatively low sample (update) rates indicated with the suffix (L) could be 44.1 kHz, 88.2 kHz, 96 kHz and 192 kHz (e.g. values within an example range of 10 kHz to 200 kHz). These are of course only examples.

Thus, for example, the second control loop (and the fourth control loop) could be 16 times (e.g. between 4 and 100 times) faster than the first control loop and 16 or 256 times (between 4 and 1000 times) faster than the third control loop. These are of course only examples.

As above, the reference signal RS (L) may be used to express haptic signals, which may have a bandwidth up to 500 Hz or even up to 1 kHz. Note, for use in audio applications, the generally accepted 20 Hz to 20 kHz typical range of human hearing—such signals could be expressed by a suitable reference signal RS (L), e.g. with a 44.1 kHz, 48 kHz, 88.2 kHz, 96 kHz or 192 kHz sample rate. Again, these values are examples.

Incidentally, the adder 560 and (optional) clipper 570 could be considered part of the driver 60, so that the driver 60 receives the reference signal RS (H) and the adjustment signal AS (H) and controls the drive output signal dos based on those received signals.

Figure 6:
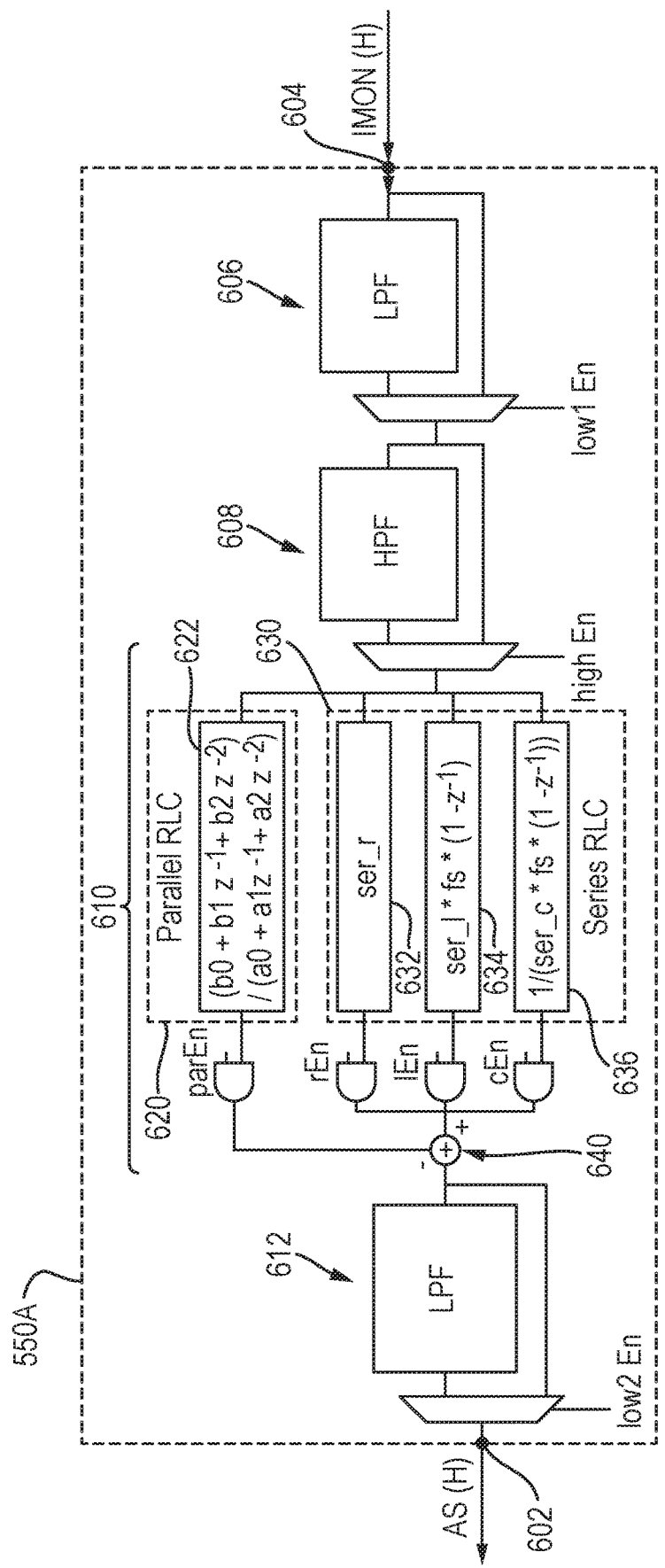
FIG. 6 is a schematic diagram of part of the driver circuitry of FIG. 5, according to a detailed implementation.

FIG. 6 is a schematic diagram of an AS determiner 550A, as a detailed example implementation of the AS determiner 550. Thus, in line with the AS determiner 550 of FIG. 5, the AS determiner 550A is configured to generate the adjustment signal AS (H) at its output node 602 based on the current-monitoring signal IMON (H) received at its input node 604. The adjustment signal AS (H) may be considered an impedance-implementation signal.

In overview, the AS determiner 550A comprises a first low-pass filter section 606, a high-pass filter section 608, a calculation section 610 and a second low-pass filter section 612 connected in series between the input node 604 and the output node 602.

The first low-pass filter section 606 comprises a pair of parallel paths, one of whose outputs can be selected by a selector based on an enable (selection) signal low1En. One of those paths comprises a low-pass filter, so that the enable signal low1En effectively determines whether or not the output signal of the first low-pass filter section 606 has been subject to low-pass filtering in that section 606.

Similarly, the high-pass filter section 608 comprises a pair of parallel paths, one of whose outputs can be selected by a selector based on an enable (selection) signal highEn. One of those paths comprises a high-pass filter, so that the enable signal highEn effectively determines whether or not the output signal of the high-pass filter section 608 has been subject to high-pass filtering in that section 608.

Similarly, the second low-pass filter section 612 comprises a pair of parallel paths, one of whose outputs can be selected by a selector based on an enable (selection) signal low2En. One of those paths comprises a low-pass filter, so that the enable signal low2En effectively determines whether or not the output signal of the second low-pass filter section 612 has been subject to low-pass filtering in that section 612.

Thus, the high and low-pass filtering may be considered optional (and as such need not be provided), and may be employed differently in different applications.

The calculation section 610 comprises a parallel RLC section 620 connected in parallel with a series RLC section 630. The parallel RLC section 620 comprises a calculation block 622 which operates on the current-monitoring signal IMON (H) to implement the parallel connection of the parallel resistance par_r, parallel capacitance par_c and parallel inductance par_l of the target output impedance 30, based on parameter or configuration values a0, a1, a2, b0, b1, b2 as indicated. The series RLC section 630 comprises calculation blocks 632, 634 and 636 connected together in parallel, which operate on the current-monitoring signal IMON (H) to implement the series resistance ser_r, series capacitance ser_c, and series inductance ser_l, respectively, of the target output impedance 30, based on corresponding parameter or configuration values ser_r, ser_c and ser_l as indicated.

The outputs of each of the calculation blocks 622, 632, 634, 636 pass via a corresponding AND block along with corresponding enable signals parEn, rEn, lEn and cEn, respectively, to an adder/subtractor 640 whose output is passed on to the second low-pass filter section 612. In this way, the contribution of the calculation blocks 622, 632, 634, 636 can be selectively included or removed from the signal received by the low-pass filter section 612 by virtue of the respective enable signals parEn, rEn, IEn and cEn. This, along with control of the parameter or configuration values as mentioned above has the effect of being able to configure the target output impedance 30 e.g. to take the form of any of the target output impedances 30A to 30E (see FIGS. 3A to 3E).

The outputs of the calculation blocks 622, 632, 634, 636 may be referred to as adjustment sub-signals each representative of a corresponding part of the target equivalent circuit representative of the target output impedance 30. The adjustment sub-signals may thus be combined to arrive at the adjustment signal AS (H). The calculation blocks 622, 632, 634, 636 may perform calculations or access look-up tables, for example.

Figure 7:
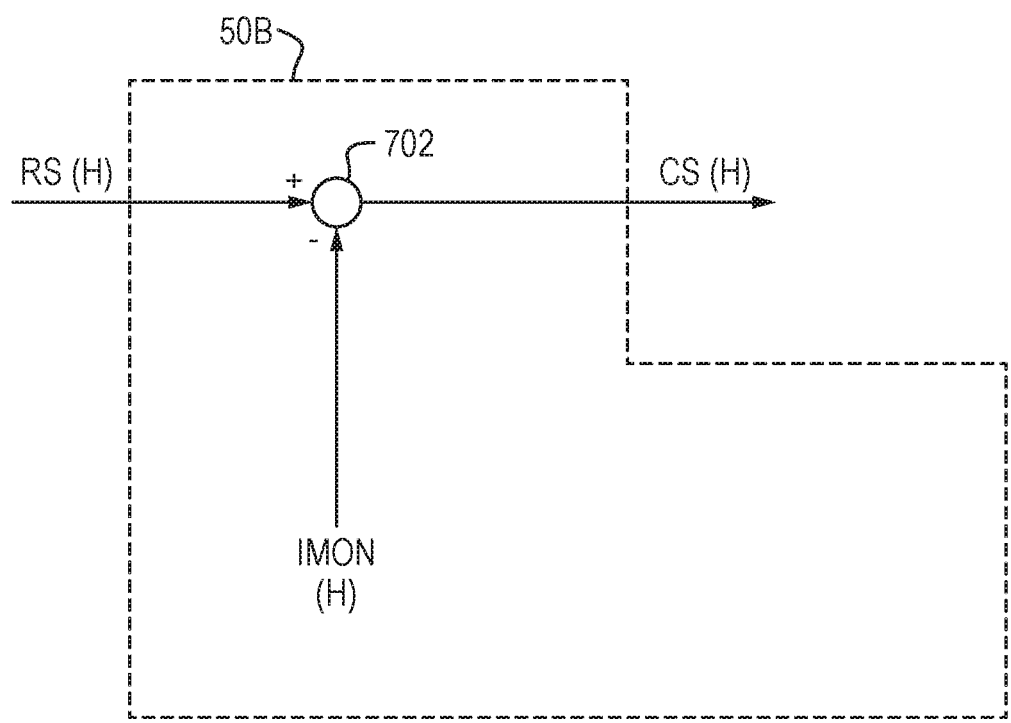
FIG. 7 is a schematic diagram of an example implementation of part of the driver circuitry of FIG. 4 for use in a current-drive mode of operation.

FIG. 7 is a schematic diagram of an example implementation 50B of the function block 50 of FIG. 4 for use in a current-drive mode of operation. In this context, it is understood that the operation described in connection with FIGS. 4 to 6 corresponds to an impedance-drive mode of operation. The signals CS (H) and IMON (H) are carried forwards here for consistency with FIGS. 5 and 6.

In the current-drive mode of operation, the function block 50 is configured to function in line with the example implementation 50B, and in particular to generate the control signal CS (H) as the result of subtracting (at a subtractor 702) the current-monitoring signal IMON (H) acting as a feedback signal from the reference signal RS (H). This negative feedback operation enables the current flowing through the LRA 20 to be controlled based on the reference signal RS (H).

It will be understood that the function block 50 of FIG. 4 may be configured to operate selectively in the impedance-drive mode of operation (in line with FIGS. 5 and 6) or the current-drive mode of operation (in line with FIG. 7), for example based on a mode-selection signal (which may be supplied by the controller 70, e.g. as part of the CONFIG signal).

Figure 8:
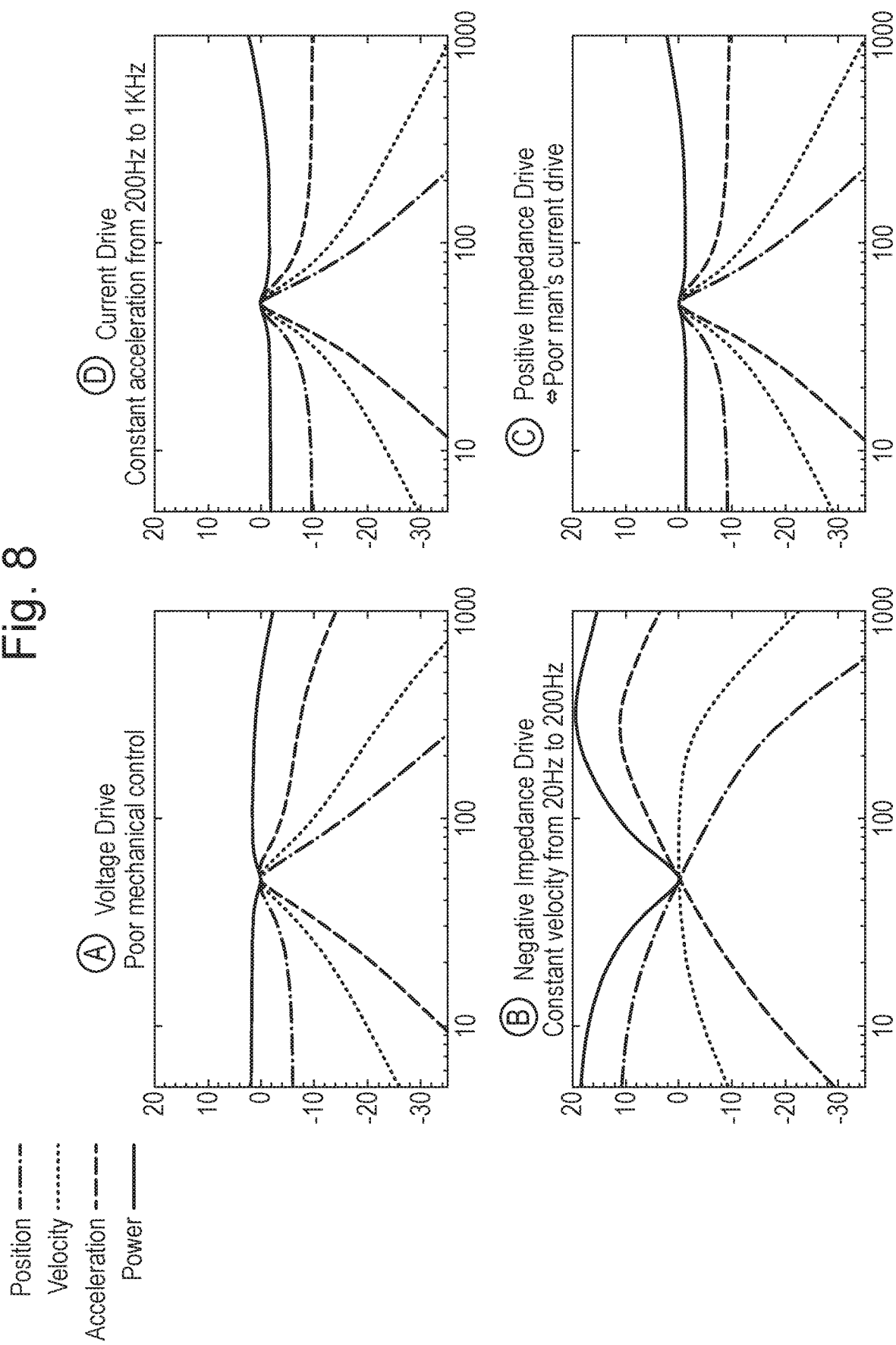
FIG. 8 presents a series of graphs useful for understanding benefits and capabilities of the driver circuitry disclosed herein.

FIG. 8 presents a series of graphs A to D (labelled clockwise starting from the top left) useful for understanding the benefits and capabilities of the driver circuitry 40A, 40B disclosed herein.

These Bode plots compare the position, velocity, acceleration and power transfer functions in various modes for driving an example typical LRA 20 with resonant frequency f0=50 Hz, and quality factor Q=3, using the driver circuitry 40A, 40B.

Graph A considers driving the LRA 20 without simulating the presence of the target output impedance 30 or by simulating the presence of the target output impedance 30 when configured to have zero impedance. This is equivalent to driving the LRA 20 in line with FIG. 1. This form of driving provides relatively poor mechanical control of the LRA 20.

Graph B considers driving the LRA 20 (in impedance-drive mode), with the simulated target output impedance 30 being configured as in the variant 30A of FIG. 3A, i.e. as a negative impedance (negative resistance). This form of driving exhibits a constant velocity transfer function from 20 Hz to 200 Hz.

Graph C considers driving the LRA 20 (in impedance-drive mode), with the simulated target output impedance 30 being configured as in the variant 30E of FIG. 3E, i.e. as a positive impedance (positive resistance) where the impedance (resistance) value is much larger (e.g. 10×) than that of the LRA 20. This form of driving exhibits a constant position transfer function below resonance (from DC to 20 Hz) and a constant acceleration transfer function above resonance (from 200 Hz to 1 KHz), but at the cost of high impedance.

Graph D considers driving the LRA 20, but using the current-drive mode of operation in line with FIG. 7 (i.e. without simulating the presence of the target output impedance 30). This form of driving exhibits a constant position transfer function below resonance (from DC to 20 Hz) and a constant acceleration transfer function above resonance (from 200 Hz to 1 KHz) similar to Graph C, but without needing the high impedance.

The acceleration waveform of typical LRAs 20 with low Q can be controlled accurately over the full haptic sensitivity range (DC-500 Hz) using negative impedance (Graph B) around resonance (20-200 Hz) and current drive (Graph D) above resonance (>200 Hz).

A so-called "poor man's" current drive can be realized by configuring the negative impedance circuit to have large positive impedance (Graph C).

Figure 9A:
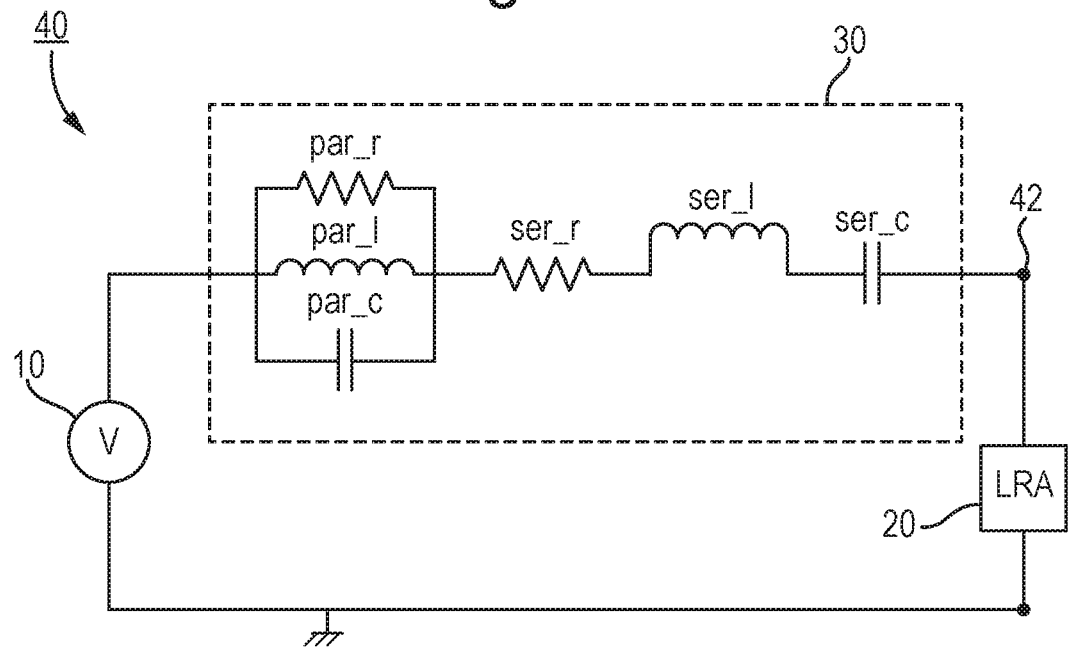
FIG. 9A is a schematic diagram of the modified driver circuitry of FIG. 2.

At this juncture it is noted that the driver circuitry arrangements have been described so far based on voltage source driving of the LRA 20 (electromechanical load), i.e. with the drive output signal dos being a voltage signal vload (and the reference signal RS being configured for voltage driving). This drive output signal dos induces a load current iload to be drawn by (or to flow through) the LRA 20. With this form of driving in mind, the load current iload is monitored (e.g. using signal IMON) and used to determine a voltage which would be induced across the target output impedance 30 so as to generate the adjustment signal AS. The driver 60 is configured to generate the drive output signal dos based on the reference signal RS and the adjustment signal AS to cause the drive output signal dos to behave as if an output impedance of the driver circuitry has been adjusted to comprise the target output impedance. FIG. 9A is a schematic diagram of the modified driver circuitry 40 of FIG. 2 as a reminder of this voltage source control, with the LRA 20 shown connected thereto for completeness.

However, driver circuitry arrangements are also envisaged based on current source driving of the LRA 20. It will be appreciated that (with the principles of source transformation in mind) it would be possible to actively control the load current iload (rather than the load voltage vload) to drive the LRA 20 by current source control in an equivalent way to the driving by voltage source control.

Figure 9B:
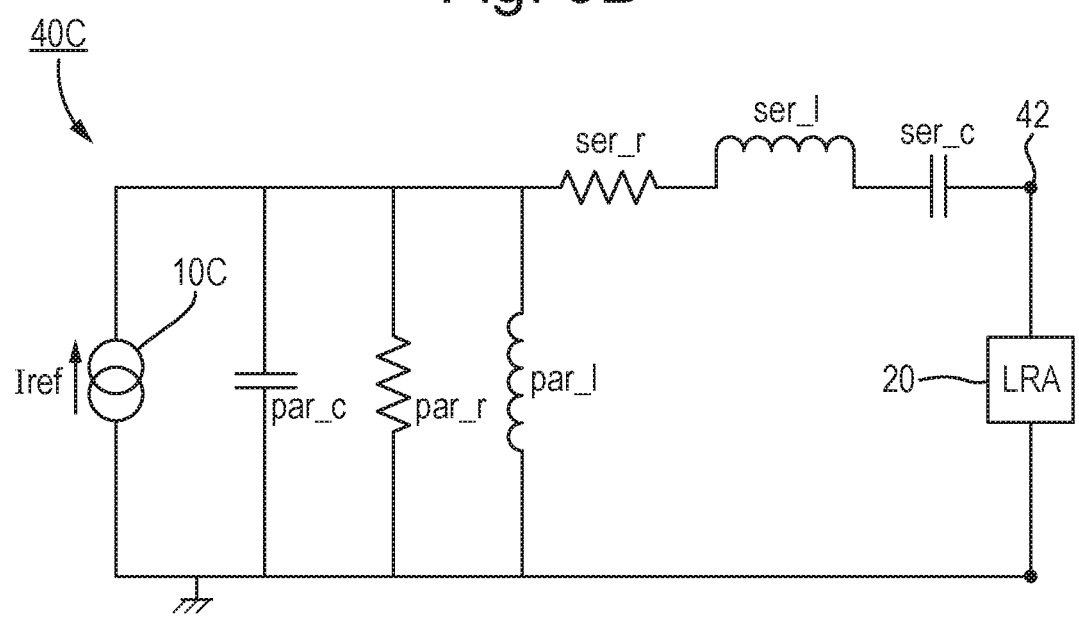
FIG. 9B is a schematic diagram corresponding to the modified driver circuitry of FIG. 2 but using current source control rather than voltage source control.

FIG. 9B is a schematic diagram of modified driver circuitry 40C which is equivalent to the modified driver circuitry 40 of FIG. 9A, but which uses current source control. control. Like elements are denoted by like reference signs. The voltage source 10 of FIG. 9B has been replaced with a current source 10C which provides a current reference signal Tref. Further, instead of providing the target output impedance (virtual impedance) 30 in series with the voltage source 10 as in FIG. 9A, it is provided in a reconfigured format in FIG. 9B in which the series components (ser_r, ser_l, ser_c) are in series with the current source 10C, and the parallel components (par_r, par_l, par_c) are in parallel with the current source 10C. The LRA 20 (separate from the modified driver circuitry 40 and 40C) is connected in the same way in both cases.

Therefore (with FIG. 9B in mind) the driver circuitry 40A and 40B of FIGS. 4 to 6 could be converted into equivalent driver circuitry based on current source driving of the LRA 20 in line with driver circuitry 40C, i.e. with the drive output signal dos being a current signal iload (and the reference signal RS being configured for current driving). This drive output signal dos induces a load voltage vload across the LRA 20. With this form of driving in mind, the load voltage vload may be monitored (e.g. using signal VMON) and used to determine a current which would be induced to flow through the target output impedance so as to generate the adjustment signal AS (i.e. so that the adjustment signal AS represents a current rather than a voltage). The driver 60 (a current amplifier, in particular a high-speed or wide-bandwidth current amplifier) may then be configured to generate the drive output (current) signal dos based on the (current based) reference signal RS and the (current based) adjustment signal AS to cause the drive output signal dos to behave as if an output impedance of the driver circuitry has been adjusted to comprise the target output impedance.

Thus, the description of FIGS. 4 to 6 may be considered accordingly and understood to apply mutatis mutandis to equivalent current source driven arrangements. That is, the driver circuitry 40A and 40B will be understood to have current source driven equivalents to which the techniques described herein apply analogously.

For example, in the voltage source driven arrangements described earlier the AS determiner 550 determines (e.g. by calculation or using a look-up table) a voltage which would be induced across the target output impedance 30 if the current flowing through the LRA 20 were to flow through the target output impedance 30. In equivalent current source driven arrangements, the AS determiner 550 determines (e.g. by calculation or using a look-up table) a current which would be drawn by the target output impedance 30 in view of the voltage across the LRA 20. Similarly, the adjustment sub-signals were described in terms of voltages in the voltage source driven arrangements but would be currents in equivalent current source driven arrangements.

As another example, in the voltage source driven arrangements described earlier the second control loop (implementing the target output impedance) uses the current monitor signal IMON to adjust a voltage signal and the fourth control loop (aiming to achieve linear operation of the driver 60) uses the voltage monitor signal VMON to adjust a voltage signal. In equivalent current source driven arrangements, the second control loop (implementing the target output impedance) uses the voltage monitor signal VMON to adjust a current signal and the fourth control loop (aiming to achieve linear operation of the driver 60) uses the current monitor signal IMON to adjust a current signal. Indeed, one skilled in the art will appreciate that the logic used for the second and fourth control loops in the voltage source driven arrangements could effectively be swapped around (with suitable changes to the reference signal RS) to lead to current source driven arrangements.

Figure 10:
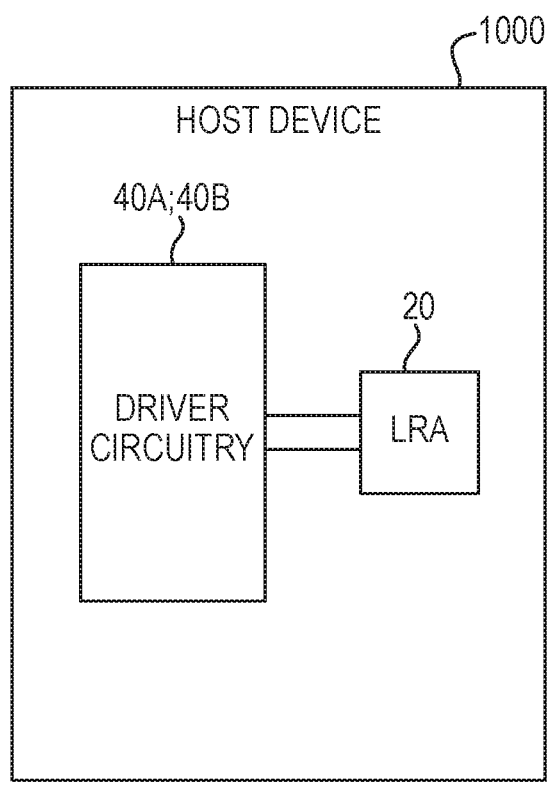
FIG. 10 is a schematic diagram of a host device according to an embodiment.

FIG. 10 is a schematic diagram of host device 1000 which comprises the driver circuitry 40A or 40B (assuming the voltage source control versions as explained in connection with FIGS. 4 and 5, or current source control versions as introduced in connection with FIG. 9B) and the LRA 20, with the driver circuitry 40A or 40B connected to drive the LRA 20. The host device 1000 may of course comprise other components (not shown) to control or operate alongside the driver circuitry, such as an applications processor.

The skilled person will recognise that some aspects of the above described apparatus (circuitry) and methods may be embodied as processor control code, for example on a non-volatile carrier medium such as a disk, CD- or DVD-ROM, programmed memory such as read only memory (Firmware), or on a data carrier such as an optical or electrical signal carrier.

For some applications, such aspects will be implemented on a DSP (Digital Signal Processor), ASIC (Application Specific Integrated Circuit) or FPGA (Field Programmable Gate Array). Thus the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware.

Some embodiments of the present invention may be arranged as part of a haptic circuit, for instance a haptic circuit which may be provided in a host device 1000 as discussed above. A circuit or circuitry according to an embodiment of the present invention (such as driver circuitry 40A or 40B) may be implemented (at least in part) as an integrated circuit (IC), for example on an IC chip. One or more input or output transducers (such as LRA 20) may be connected to the integrated circuit in use.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope.

The present disclosure extends to the following set A of statements:

A1. Driver circuitry for driving an electromechanical load with a drive output signal based on a digital reference signal at a first sample rate, the drive output signal inducing a first electrical quantity at the electromechanical load, the driver circuitry comprising:
  a function block configured, based on said first electrical quantity, to digitally determine at a second sample rate higher than the first sample rate an adjustment signal indicative of a second electrical quantity which would be induced at a target output impedance of the driver circuitry due to said first electrical quantity; and
  a driver configured to generate the drive output signal based on the reference signal and the adjustment signal to cause the drive output signal to behave as if an output impedance of the driver circuitry has been adjusted to comprise the target output impedance,
  wherein the first electrical quantity is a current and the second electrical quantity is a voltage, or vice versa.

A2. The driver circuitry according to statement A1, wherein:
  the drive output signal is a voltage signal, the first electrical quantity is a current drawn by the electromechanical load and the second electrical quantity is a voltage across the target output impedance; or
  the drive output signal is a current signal, the first electrical quantity is a voltage across the electromechanical load and the second electrical quantity is a current drawn by the target output impedance.

A3. The driver circuitry according to statement A1 or A2, wherein the function block is configured to digitally determine the adjustment signal based on said first electrical quantity and a definition of said target output impedance.

A4. The driver circuitry according to statement A3, wherein the definition comprises one or more configuration values.

A5. The driver circuitry according to statement A4, comprising storage for storing the one or more configuration values, wherein an impedance value of the target output impedance is maintained when the one or more configuration values stored in the storage are maintained.

A6. The driver circuitry according to any of statements A4 or A5, wherein:
- a target equivalent circuit representative of the target output impedance comprises one or more impedance components and a circuit structure for connecting the one or more impedance components together; and
- the one or more configuration values define at least one said impedance component and/or said circuit structure.

A7. The driver circuitry according to statement A6, wherein:
- the target equivalent circuit comprises a plurality of impedance components connected together; and
- the function block is configured, based on said first electrical quantity and the one or more configuration values, to:
- determine a plurality of adjustment sub-signals each representative of a corresponding part of the target equivalent circuit and indicative of a portion of the second electrical quantity which would be induced at the corresponding part of the target equivalent circuit if said second electrical quantity were induced at the target equivalent circuit; and
- determine the adjustment signal by combining the plurality of adjustment sub-signals, and optionally wherein:
- the portion of the second electrical quantity is a voltage across the corresponding part of the target equivalent circuit if the second electrical quantity is the voltage across the target output impedance; and
- the portion of the second electrical quantity is a current drawn by the corresponding part of the target equivalent circuit if the second electrical quantity is the current drawn by the target output impedance.

A8. The driver circuitry according to statement A6 or A7, wherein:
- the one or more configuration values define the target equivalent circuit to comprise at least one of a series resistor, a series capacitor, a series inductor and a parallel network of impedances, the parallel network of impedances comprising at least two of a parallel resistor, a parallel capacitor and a parallel inductor connected together in parallel, each of those resistors, capacitors and inductors being a said impedance component,
- optionally wherein those of the series resistor, the series capacitor, the series inductor and the parallel network of impedances present in the target equivalent circuit are connected in series.

A9. The driver circuitry according to statement A8, wherein the one or more configuration values define the target equivalent circuit to comprise, optionally only:
- the series resistor, wherein the series resistor has a negative resistance;
- the series resistor and the series inductor connected together in series, wherein the series resistor has a negative resistance and the series inductor has a negative inductance;
- the series resistor and the series inductor connected together in series and to the parallel network of impedances, wherein the series resistor has a negative resistance and the series inductor has a negative inductance, and wherein the parallel network of impedances comprises the parallel resistor, the parallel capacitor and the parallel inductor connected together in parallel;
- the series resistor and the series capacitor connected together in series, wherein the series resistor has a negative resistance and the series capacitor has a positive capacitance; or
- the series resistor, wherein the series resistor has a positive resistance, and wherein the positive resistance is substantially larger than a resistance of the electromechanical load, or than a resistance of a resistor in an electromechanical-load equivalent circuit representing a mechanical impedance of the electromechanical load.

A10. The driver circuitry according to any of the preceding A statements, comprising a controller configured:
- to generate the reference signal based on a drive input signal and based on a current drawn by the electromechanical load and/or a voltage across the electromechanical load; and/or
- to control, based on said current drawn by the electromechanical load and/or said voltage across the electromechanical load, a definition of the target output impedance to cause a performance such as a mechanical performance of the electromechanical load to meet a performance target; and/or
- to control, based on said current drawn by the electromechanical load and/or said voltage across the electromechanical load, a definition of the target output impedance to cause the target output impedance to cancel an impedance of at least one electrical component of the electromechanical load, optionally a coil such as a voice coil; and/or
- to control a definition of the target output impedance based on an impedance control signal to cause a performance of the driver circuitry to vary with the impedance control signal.

A11. The driver circuitry according to any of the preceding A statements, wherein the driver is configured to generate the drive output signal so that the drive output signal has a predefined relationship with a summation of the adjustment signal and the reference signal.

A12. The driver circuitry according to any of the preceding A statements, wherein:
- the function block is configured to generate a control signal having a predefined relationship with a summation of the adjustment signal and the reference signal; and
- the driver is configured to generate the drive output signal so that the drive output signal has a predefined relationship with the control signal.

A13. The driver circuitry according to statement A12, wherein:
- the driver circuitry is selectively operable in an impedance-drive mode or a current-drive mode;
- the control signal is generated based on the reference signal and the adjustment signal so that the drive output signal behaves as if the output impedance of the driver circuitry has been adjusted to comprise the target output impedance when the driver circuitry is in the impedance-drive mode; and
- in the current-drive mode, the function block is configured to generate the control signal as a function of a current-control reference signal and a current drawn by the electromechanical load, and to adjust the control signal based on said current drawn by the electromechanical load so that said current drawn by the electromechanical load has a predefined relationship with the current-control reference signal.

A14. The driver circuitry according to statement A12 or A13, wherein:
at least one of the control signal and the adjustment signal is a digital signal;
the control signal and the adjustment signal are digital signals, and the function block is a digital function block; and/or
the drive output signal is an analogue signal.

A15. The driver circuitry according to any of statements A12 to A14, wherein:
the control signal is a digital signal; and
the driver comprises a digital-to-analogue converter and an analogue amplifier connected together to convert the control signal into an analogue signal and then amplify that analogue signal to form the drive output signal.

A16. The driver circuitry according to any of the preceding A statements, comprising a monitoring unit configured to generate a current monitoring signal indicative of a current drawn by the electromechanical load and/or a voltage monitoring signal indicative of a voltage across the electromechanical load, wherein the function block is configured to digitally determine the adjustment signal based on the current monitoring signal and/or the voltage monitoring signal.

A17. The driver circuitry according to any of the preceding A statements, wherein:
the reference signal is indicative of an intended mechanical performance of the electromechanical load; and/or
the behaviour of the drive output signal as if the output impedance of the driver circuitry has been adjusted to comprise the target output impedance is relative to an expected behaviour of an expected drive output signal expected to be generated by the driver based on the reference signal without the adjustment signal; and/or
the driver circuitry comprises one or more analogue impedance components connected to contribute to the output impedance of the driver circuitry; and/or
the target output impedance is configured to cancel an impedance of at least one electrical component of the electromechanical load, optionally a coil such as a voice coil; and/or
said electromechanical load is an electromechanical device such as an actuator; and/or
said electromechanical load is a resonant electromechanical load such as a linear resonant actuator, a speaker or a microspeaker.

A18. The driver circuitry according to any of the preceding A statements, wherein:
the driver forms part of a first control loop operable to control the drive output signal based on the reference signal;
the driver and the function block form part of a second control loop operable to control the drive output signal based on a current drawn by the electromechanical load and/or a voltage across the electromechanical load; and
the second control loop is configured to have a lower latency than the first control loop.

A19. The driver circuitry according to statement A18, wherein at least part of the first control loop and at least part of the second control loop are implemented as digital circuitry, and wherein the latencies of the first and second control loops are defined by sample rates of respective digital signals of the first and second control loops.

A20. The driver circuitry according to any of the preceding A statements, comprising an analogue impedance configured to form part of the output impedance of the driver circuitry,
optionally wherein the analogue impedance is a controllable analogue impedance and the function block is configured to control the controllable analogue impedance to adjust the output impedance of the driver circuitry.

A21. The driver circuitry according to statement A20, configured to control a definition of the target output impedance and/or an impedance of the analogue impedance to control the output impedance of the driver circuitry.

A22. The driver circuitry according to any of the preceding A statements, implemented as integrated circuitry such as on an IC chip.

A23. An IC chip comprising the driver circuitry according to any of the preceding A statements.

A24. A control system, comprising:
the driver circuitry according to any of the preceding A statements; and
the electromechanical load,
wherein the electromechanical load is connected to be driven by said drive output signal.

A25. A haptic system comprising the control system of statement A24, wherein the electromechanical load is a linear resonant actuator coupled to a physical structure or surface of the system to produce a haptic effect for a user.

A26. A host device, such as portable electrical or electronic device, comprising the driver circuitry according to any of statements A1 to A22, or the IC chip of statement A23, or the control system of statement A24 or the haptic system of statement A25.

A27. A method carried out by driver circuitry to drive an electromechanical load with a drive output signal based on a digital reference signal, the drive output signal inducing a first electrical quantity at the electromechanical load, the method comprising:
based on said first electrical quantity, digitally determining at a second sample rate higher than the first sample rate an adjustment signal indicative of a second electrical quantity which would be induced at a target output impedance of the driver circuitry due to said first electrical quantity; and
generating the drive output signal based on the reference signal and the adjustment signal to cause the drive output signal to behave as if an output impedance of the driver circuitry has been adjusted to comprise the target output impedance,
wherein the first electrical quantity is a current and the second electrical quantity is a voltage, or vice versa.

The present disclosure extends to the following set B of statements:
B1. Driver circuitry for driving an electromechanical load with a drive output signal, the driver circuitry comprising:
a first control loop operable to control the drive output signal based on a drive input signal; and
a second control loop operable to control the drive output signal based on a current flowing through and/or a voltage induced across the electromechanical load,
wherein the second control loop is configured to have a lower latency than the first control loop.

B2. The driver circuitry according to statement B1, wherein the second control loop is configured to control the drive output signal to compensate for an impedance of the electromechanical load.

B3. The driver circuitry according to statement B1 or B2, wherein the second control loop is configured to control the drive output signal so that it behaves as if an output impedance of the driver circuitry has been adjusted to comprise a target output impedance.

B4. The driver circuitry according to statement B3, wherein the drive output signal is a voltage signal and the second control loop is configured to perform its control of the drive output signal based on a voltage signal which would be induced across the target output impedance by said current,
optionally wherein the second control loop is configured to determine, based on said current, an adjustment signal indicative of said voltage signal, and control the drive output signal based on the adjustment signal.

B5. The driver circuitry according to statement B3, wherein the drive output signal is a current signal and the second control loop is configured to perform its control of the drive output signal based on a current signal of a current which would be induced to flow through the target output impedance by said voltage,
optionally wherein the second control loop is configured to determine, based on said voltage, an adjustment signal indicative of said current signal, and control the drive output signal based on the adjustment signal.

B6. The driver circuitry according to any of the preceding B statements, comprising a third control loop operable to:
determine, based on said current and/or said voltage, one or more configuration values for defining the target output impedance; and
provide the determined configuration values to the second control loop to define the target output impedance.

B7. The driver circuitry according to statement B6, wherein the latency of the second control loop is lower than a latency of the third control loop.

B8. The driver circuitry according to any of the preceding B statements, wherein the first control loop is configured for feedback control of the electromechanical load based on said current and/or said voltage.

B9. The driver circuitry according to any of the preceding B statements, wherein the first control loop is configured for feedforward control of the electromechanical load.

B10. The driver circuitry according to any of the preceding B statements, wherein the second control loop is a feedback control loop, said current and/or said voltage being a feedback signal in the second control loop.

B11. The driver circuitry according to any of the preceding B statements, wherein at least part of the first control loop and at least part of the second control loop are implemented as digital circuitry, and wherein the latencies of the first and second control loops are defined by sample rates of respective digital signals of the first and second control loops.

B12. The driver circuitry according to any of the preceding B statements, comprising:
a monitor unit configured to monitor said current and/or said voltage and generate a monitor signal indicative of said current and/or said voltage;
a controller operable to generate a reference signal based on said drive input signal and said monitor signal;
a function block operable to generate an adjustment signal based on said monitor signal; and
a driver operable to generate said drive output signal based on said reference signal and said adjustment signal.

B13. The driver circuitry according to statement B12, wherein:
said first control loop comprises a first signal path which extends from said monitor unit to said driver via said controller, the first signal path carrying said monitor signal and said reference signal;
said second control loop comprises a second signal path which extends from said monitor unit to said driver via said function block, the second signal path carrying said monitor signal and said adjustment signal;
at least one signal carried by said first control loop and one or more signals carried by said second control loop are digital signals; and
the one or more digital signals carried by said second control loop have a higher sample rate than the at least one digital signal carried by said first control loop.

B14. The driver circuitry according to statement B13, wherein:
at least one signal carried by said first control loop between said monitor unit and said controller and at least one signal carried by said first control loop between said controller and said driver are digital signals; and
the one or more digital signals carried by said second control loop have a higher sample rate than the at least one digital signal carried by said first control loop between said monitor unit and said controller and/or the at least one signal carried by said first control loop between said controller and said driver.

B15. The driver circuitry according to any of statements B12 to B14, wherein:
the function block is operable to generate a control signal based on said adjustment signal and said reference signal; and
the driver is operable to generate said drive output signal based on said control signal.

B16. The driver circuitry according to any of the preceding B statements, wherein:
the reference signal and/or the drive input signal is indicative of an intended mechanical performance of the electromechanical load; and/or
said electromechanical load is an electromechanical device such as an actuator; and/or
said electromechanical load is a resonant electromechanical load such as a linear resonant actuator, a speaker or a microspeaker.

B17. The driver circuitry according to any of the preceding B statements, implemented as integrated circuitry such as on an IC chip.

B18. An IC chip comprising the driver circuitry according to any of the preceding B statements.

B19. A control system, comprising:
the driver circuitry according to any of the preceding B statements; and
the electromechanical load,
wherein the electromechanical load is connected to be driven by said drive output signal.

B20. A haptic system comprising the control system of statement B19, wherein the electromechanical load is a linear resonant actuator coupled to a physical structure or surface of the system to produce a haptic effect for a user.

B21. A host device, such as portable electrical or electronic device, comprising the driver circuitry according to any of statements B1 to B17, or the IC chip of statement B18, or the control system of statement B19 or the haptic system of statement B20.

B22. A method of driving an electromechanical load with a drive output signal, the method comprising:
  with a first control loop, controlling the drive output signal based on a drive input signal; and
  with a second control loop, controlling the drive output signal based on a current flowing through and/or a voltage induced across the electromechanical load,
  wherein the second control loop is configured to have a lower latency than the first control loop.

The present disclosure extends to the following set C of statements:

C1. Driver circuitry for driving an electromechanical load with a drive output signal based on a reference signal, the drive output signal inducing a first electrical quantity at the electromechanical load, the driver circuitry comprising:
  a function block configured, based on said first electrical quantity, to digitally determine an adjustment signal indicative of a second electrical quantity which would be induced at a target output impedance of the driver circuitry due to said first electrical quantity; and
  a driver configured to generate the drive output signal based on the reference signal and the adjustment signal to cause the drive output signal to behave as if an output impedance of the driver circuitry has been adjusted to comprise the target output impedance,
  wherein:
    the drive output signal is a voltage signal, the first electrical quantity is a current drawn by the electromechanical load and the second electrical quantity is a voltage across the target output impedance; or
    the drive output signal is a current signal, the first electrical quantity is a voltage across the electromechanical load and the second electrical quantity is a current drawn by the target output impedance.

C2. Driver circuitry for driving an electromechanical load with a drive output signal based on a reference signal, the drive output signal being a voltage signal and causing a current to be drawn by the electromechanical load, the driver circuitry comprising:
  a function block configured, based on said current, to digitally determine an adjustment signal indicative of a voltage signal which would be induced across a target output impedance of the driver circuitry by said current; and
  a driver configured to generate the drive output signal based on the reference signal and the adjustment signal to cause the drive output signal to behave as if an output impedance of the driver circuitry has been adjusted to comprise the target output impedance.

C3. Driver circuitry for driving a linear resonant actuator, the driver circuitry comprising:
  a function block configured to generate a digital control signal as a function of a digital reference signal, intended for controlling the linear resonant actuator, and a monitor signal; and
  a driver configured to convert the digital control signal into an analogue drive signal to drive the linear resonant actuator,
  wherein:
    the monitor signal is indicative of a current flowing through, and/or a voltage across, the linear resonant actuator; and
    the function block is configured, based on the monitor signal, to control a difference between the digital control signal and the digital reference signal so that the analogue drive signal when driving the linear resonant actuator has a target behaviour in which the analogue drive signal behaves, relative to an expected analogue drive signal expected to be generated with the digital control signal being the digital reference signal, as if the output impedance of the driver circuitry has been adjusted to comprise a target output impedance.

C4. Driver circuitry for driving an electromechanical load with a drive output signal based on a reference signal, the driver circuitry configured to generate the drive output signal based on a digital operation dependent on the reference signal and an electrical quantity induced at the electromechanical load to cause the drive output signal to behave as if an output impedance of the driver circuitry has been adjusted to comprise a target output impedance.

C5. Driver circuitry for driving an electromechanical load with a drive output signal based on a reference signal, the drive output signal inducing a first electrical quantity at the electromechanical load, the driver circuitry comprising:
  a function block configured, based on said first electrical quantity, to digitally determine an adjustment signal indicative of a second electrical quantity which would be induced at a target output impedance of the driver circuitry due to said first electrical quantity; and
  a driver configured to generate the drive output signal based on the reference signal and the adjustment signal to cause the drive output signal to behave as if an output impedance of the driver circuitry has been adjusted to comprise the target output impedance.

C6. Driver circuitry for driving an electromechanical load with a drive output signal based on a reference signal, the driver circuitry configured to digitally control the drive output signal based on the reference signal to cause the drive output signal to behave as if an output impedance of the driver circuitry has been adjusted to comprise a defined or predetermined target output impedance.

C7. Driver circuitry for driving an electromechanical load with a drive output signal based on a reference signal, the driver circuitry configured to digitally control the drive output signal based on the reference signal and an electrical quantity at the electromechanical load to cause the drive output signal to behave as if an output impedance of the driver circuitry has been adjusted to comprise a defined or predetermined target output impedance.

The invention claimed is:

1. Driver circuitry for driving an electromechanical load with a drive output signal based on a reference signal, the drive output signal inducing a first electrical quantity at the electromechanical load, the driver circuitry comprising:
  a function block configured, based on said first electrical quantity, to digitally determine an adjustment signal indicative of a second electrical quantity which would be induced at a target output impedance of the driver circuitry due to said first electrical quantity; and
  a driver configured to generate the drive output signal based on the reference signal and the adjustment signal to cause the drive output signal to behave as if an output impedance of the driver circuitry has been adjusted to comprise the target output impedance,
  wherein:
    the drive output signal is a voltage signal, the first electrical quantity is a current drawn by the electromechanical load and the second electrical quantity is a voltage across the target output impedance; or
    the drive output signal is a current signal, the first electrical quantity is a voltage across the electromechanical load and the second electrical quantity is a current drawn by the target output impedance; or the reference signal is a digital reference signal.

2. The driver circuitry according to claim 1, wherein the function block is configured to digitally determine the adjustment signal based on said first electrical quantity and a definition of said target output impedance.

3. The driver circuitry according to claim 2, wherein the definition comprises one or more configuration values.

4. The driver circuitry according to claim 3, comprising storage for storing the one or more configuration values, wherein an impedance value of the target output impedance is maintained when the one or more configuration values stored in the storage are maintained.

5. The driver circuitry according to claim 3, wherein:
a target equivalent circuit representative of the target output impedance comprises one or more impedance components and a circuit structure for connecting the one or more impedance components together; and
the one or more configuration values define at least one said impedance component and/or said circuit structure.

6. The driver circuitry according to claim 5, wherein:
the target equivalent circuit comprises a plurality of impedance components connected together; and
the function block is configured, based on said first electrical quantity and the one or more configuration values, to:
determine a plurality of adjustment sub-signals each representative of a corresponding part of the target equivalent circuit and indicative of a portion of the second electrical quantity which would be induced at the corresponding part of the target equivalent circuit if said second electrical quantity were induced at the target equivalent circuit; and
determine the adjustment signal by combining the plurality of adjustment sub-signals,
and optionally wherein:
the portion of the second electrical quantity is a voltage across the corresponding part of the target equivalent circuit if the second electrical quantity is the voltage across the target output impedance; and
the portion of the second electrical quantity is a current drawn by the corresponding part of the target equivalent circuit if the second electrical quantity is the current drawn by the target output impedance.

7. The driver circuitry according to claim 5, wherein:
the one or more configuration values define the target equivalent circuit to comprise at least one of a series resistor, a series capacitor, a series inductor and a parallel network of impedances, the parallel network of impedances comprising at least two of a parallel resistor, a parallel capacitor and a parallel inductor connected together in parallel, each of those resistors, capacitors and inductors being a said impedance component,
optionally wherein those of the series resistor, the series capacitor, the series inductor and the parallel network of impedances present in the target equivalent circuit are connected in series.

8. The driver circuitry according to claim 7, wherein the one or more configuration values define the target equivalent circuit to comprise, optionally only:
the series resistor, wherein the series resistor has a negative resistance;

the series resistor and the series inductor connected together in series, wherein the series resistor has a negative resistance and the series inductor has a negative inductance;

the series resistor and the series inductor connected together in series and to the parallel network of impedances, wherein the series resistor has a negative resistance and the series inductor has a negative inductance, and wherein the parallel network of impedances comprises the parallel resistor, the parallel capacitor and the parallel inductor connected together in parallel;

the series resistor and the series capacitor connected together in series, wherein the series resistor has a negative resistance and the series capacitor has a positive capacitance; or the series resistor, wherein the series resistor has a positive resistance, and wherein the positive resistance is substantially larger than a resistance of the electromechanical load, or than a resistance of a resistor in an electromechanical-load equivalent circuit representing a mechanical impedance of the electromechanical load.

9. The driver circuitry according to claim 1, comprising a controller configured:
to generate the reference signal based on a drive input signal and based on a current drawn by the electromechanical load and/or a voltage across the electromechanical load; and/or
to control, based on said current drawn by the electromechanical load and/or said voltage across the electromechanical load, a definition of the target output impedance to cause a performance such as a mechanical performance of the electromechanical load to meet a performance target; and/or
to control, based on said current drawn by the electromechanical load and/or said voltage across the electromechanical load, a definition of the target output impedance to cause the target output impedance to cancel an impedance of at least one electrical component of the electromechanical load, optionally a coil such as a voice coil; and/or
to control a definition of the target output impedance based on an impedance control signal to cause a performance of the driver circuitry to vary with the impedance control signal.

10. The driver circuitry according to claim 1, wherein the driver is configured to generate the drive output signal so that the drive output signal has a predefined relationship with a summation of the adjustment signal and the reference signal.

11. The driver circuitry according to claim 1, wherein:
the function block is configured to generate a control signal having a predefined relationship with a summation of the adjustment signal and the reference signal; and
the driver is configured to generate the drive output signal so that the drive output signal has a predefined relationship with the control signal.

12. The driver circuitry according to claim 11, wherein:
the driver circuitry is selectively operable in an impedance-drive mode or a current-drive mode;
the control signal is generated based on the reference signal and the adjustment signal so that the drive output signal behaves as if the output impedance of the driver circuitry has been adjusted to comprise the target output impedance when the driver circuitry is in the impedance-drive mode; and in the current-drive mode, the function block is configured to generate the control signal as a function of a current-control reference signal and a current drawn by the electromechanical load, and to adjust the control signal based on said current drawn by the electromechanical load so that said current drawn by the electromechanical load has a predefined relationship with the current-control reference signal.

13. The driver circuitry according to claim 11, wherein:
at least one of the control signal and the adjustment signal is a digital signal;
the control signal and the adjustment signal are digital signals, and the function block is a digital function block; and/or
the drive output signal is an analogue signal.

14. The driver circuitry according to claim 11, wherein:
the control signal is a digital signal; and
the driver comprises a digital-to-analogue converter and an analogue amplifier connected together to convert the control signal into an analogue signal and then amplify that analogue signal to form the drive output signal.

15. The driver circuitry according to claim 1, wherein:
the driver forms part of a first control loop operable to control the drive output signal based on the reference signal;
the driver and the function block form part of a second control loop operable to control the drive output signal based on a current drawn by the electromechanical load and/or a voltage across the electromechanical load; and
the second control loop is configured to have a lower latency than the first control loop.

16. The driver circuitry according to claim 1, wherein:
the reference signal is indicative of an intended mechanical performance of the electromechanical load; and/or
the behaviour of the drive output signal as if the output impedance of the driver circuitry has been adjusted to comprise the target output impedance is relative to an expected behaviour of an expected drive output signal expected to be generated by the driver based on the reference signal without the adjustment signal; and/or
the driver circuitry comprises one or more analogue impedance components connected to contribute to the output impedance of the driver circuitry; and/or
the target output impedance is configured to cancel an impedance of at least one electrical component of the electromechanical load, optionally a coil such as a voice coil; and/or
said electromechanical load is an electromechanical device such as an actuator; and/or
said electromechanical load is a resonant electromechanical load such as a linear resonant actuator, a speaker or a microspeaker.

17. The driver circuitry according to claim 1, configured to control a definition of the target output impedance to control the output impedance of the driver circuitry.

18. A host device or an IC chip comprising the driver circuitry according to claim 1.

19. Driver circuitry for driving a linear resonant actuator, the driver circuitry comprising:
a function block configured to generate a digital control signal as a function of a digital reference signal, intended for controlling the linear resonant actuator, and a monitor signal; and
a driver configured to convert the digital control signal into an analogue drive signal to drive the linear resonant actuator,
wherein:
the monitor signal is indicative of a current flowing through, and/or a voltage across, the linear resonant actuator; and
the function block is configured, based on the monitor signal, to control a difference between the digital control signal and the digital reference signal so that the analogue drive signal when driving the linear resonant actuator has a target behaviour in which the analogue drive signal behaves, relative to an expected analogue drive signal expected to be generated with the digital control signal being the digital reference signal, as if the output impedance of the driver circuitry has been adjusted to comprise a target output impedance.

* * * * *